(12) United States Patent
Ishii

(10) Patent No.: US 11,388,341 B2
(45) Date of Patent: Jul. 12, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Toshiyuki Ishii, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/925,756

(22) Filed: Jul. 10, 2020

(65) Prior Publication Data

US 2021/0021767 A1   Jan. 21, 2021

(30) Foreign Application Priority Data

Jul. 19, 2019 (JP) .................................. 2019-133568
Mar. 30, 2020 (JP) ............................. JP2020-061442

(51) Int. Cl.
*H04N 5/232* (2006.01)

(52) U.S. Cl.
CPC ............................ *H04N 5/232945* (2018.08)

(58) Field of Classification Search
CPC ............. H04N 5/232; H04N 5/232945; H04N 5/232935
See application file for complete search history.

(56) References Cited

U.S. PATENT DOCUMENTS

| 2005/0237410 | A1* | 10/2005 | Shiohara | ............ | H04N 5/23293 348/333.01 |
| 2019/0289201 | A1* | 9/2019 | Nishimura | .......... | G06F 3/04883 |

FOREIGN PATENT DOCUMENTS

JP          H0738801 A     2/1995

* cited by examiner

*Primary Examiner* — Yogesh K Aggarwal
(74) *Attorney, Agent, or Firm* — Rossi, Kimms & McDowell, LLP

(57) ABSTRACT

To provide an image capturing apparatus with distribution information on an image capturing signal suitable for a display apparatus, an image processing apparatus includes: an image data acquisition unit configured to acquire image data; a configuration information acquisition unit configured to acquire configuration information on a display apparatus which displays at least a part of an image indicated by the image data; a range determination unit configured to determine a range corresponding to the part of the image based on the configuration information; and a display control unit configured to cause a display unit to display the image with distribution information of pixel values corresponding to the range of the image.

23 Claims, 19 Drawing Sheets

IMAGE PROCESSING APPARATUS, IMAGE PROCESSING METHOD, AND STORAGE MEDIUM

BACKGROUND OF THE INVENTION

Field of the Invention

The present invention relates to an image processing technique to assist image capturing by an image capturing apparatus.

Description of the Related Art

An image obtained by image capturing is conventionally displayed by a display apparatus such as a display. In the case of displaying an image obtained by image capturing, however, it is necessary to confirm distribution information of pixel values on an image capturing signal together with the image capturing signal in order to set white balance and exposure of the image capturing signal appropriately in image capturing.

As a technique to assist image capturing in such a case, Japanese Patent Laid-Open No. H07-38801, (PTL 1) discloses a technique to convert the distribution of luminance levels of pixel values of an image capturing signal into a histogram, superimpose the histogram on the image capturing signal, and cause a viewfinder to display the histogram.

However, the technique disclosed in PTL 1 only shows distribution information of pixel values corresponding to the display on the viewfinder. Accordingly, for example, in the case of clipping a part of an image capturing signal, performing a geometrical conversion of the image, and displaying the image on a display apparatus, there is a problem that a display range often does not correspond to distribution information and it is impossible to generate and provide suitable distribution information for setting white balance and exposure of the image capturing signal.

SUMMARY OF THE INVENTION

The present invention aims to provide an image capturing apparatus with distribution information on an image capturing signal suitable for a display apparatus.

An embodiment of an image processing apparatus of the present invention includes: an image data acquisition unit configured to acquire image data; a configuration information acquisition unit configured to acquire configuration information on a display apparatus which displays at least a part of an image indicated by the image data; a range determination unit configured to determine a range corresponding to the part of the image based on the configuration information; and a display control unit configured to cause a display unit to display the image with distribution information of pixel values corresponding to the range of the image.

Further features of the present invention will become apparent from the following description of exemplary embodiments with reference to the attached drawings.

DESCRIPTION OF THE EMBODIMENTS

Figure 1:
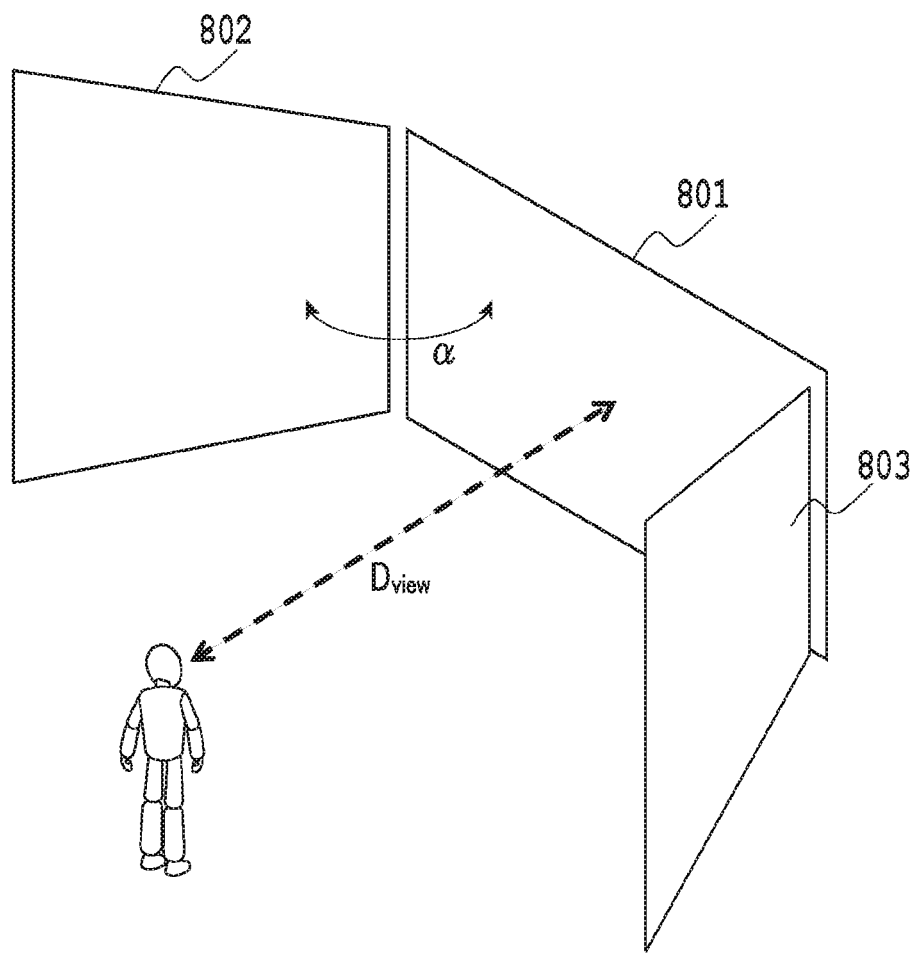
FIG. 1 is a diagram showing a display system.

Hereinafter, with reference to the attached drawings, the present invention is explained in detail in accordance with preferred embodiments. Configurations shown in the following embodiments are merely exemplary and the present invention is not limited to the configurations shown schematically.

First, a supplementary explanation will be given of the problem to be solved by the present invention, followed by the description of the embodiments of the present invention with reference to the drawings. The embodiments described below do not limit the present invention. Not all combinations of the features described in the embodiments are essential for solving the problem to be solved by the present invention. In the description below, the same reference numerals are assigned to the same features.

Before the description of the embodiments, a supplementary explanation will be given of the problem to be solved by the present invention. In the case of causing a display apparatus different from an image capturing apparatus to display an image obtained by image capturing, it is necessary to clip a part of the image depending on the configuration of the display apparatus. In this case, however, if colors and exposure of a range to be clipped cannot be confirmed in framing at the time of image capturing, color tone adjustment for the entire image often interferes with image capturing settings suitable for the actually used clipped range.

For example, it is assumed that an image is displayed by a display system shown in FIG. 1. The display system of FIG. 1 comprises three screens and three projectors. In the display system of FIG. 1, a left side screen 802 and a right side screen 803 are arranged at a spread angle α with respect to a center screen 801.

Although not shown in FIG. 1, the three projectors are piled and arranged directly above a viewpoint position (viewer) to project images on the respective screens. It is assumed that the viewpoint position is apart from the center of the center screen 801 by a distance $D_{view}$ in a direction orthogonal to the center screen 801. In this manner, video is displayed using the three screens arranged to cover the greater part of the viewer's field of view, which makes it possible to provide high reality video experience as if the viewer is present there.

Figure 2A:
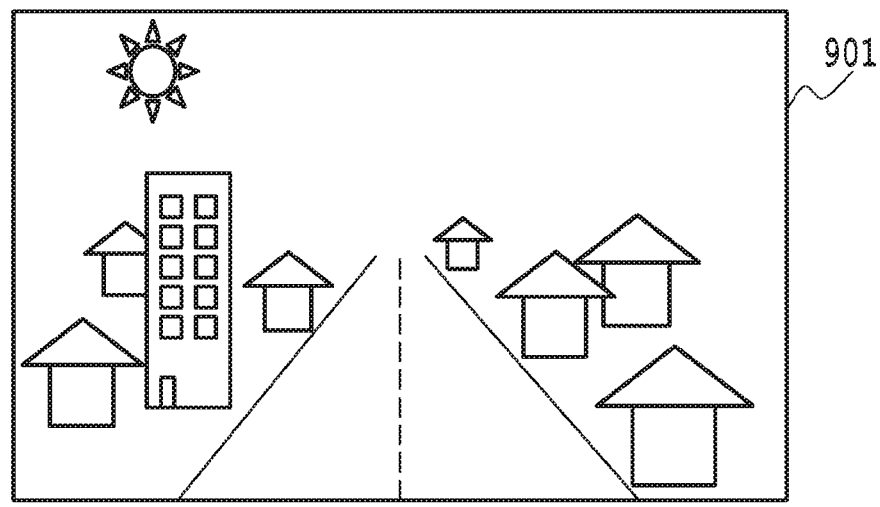
FIG. 2A is a diagram for explaining display ranges of the display system.
Figure 2B:
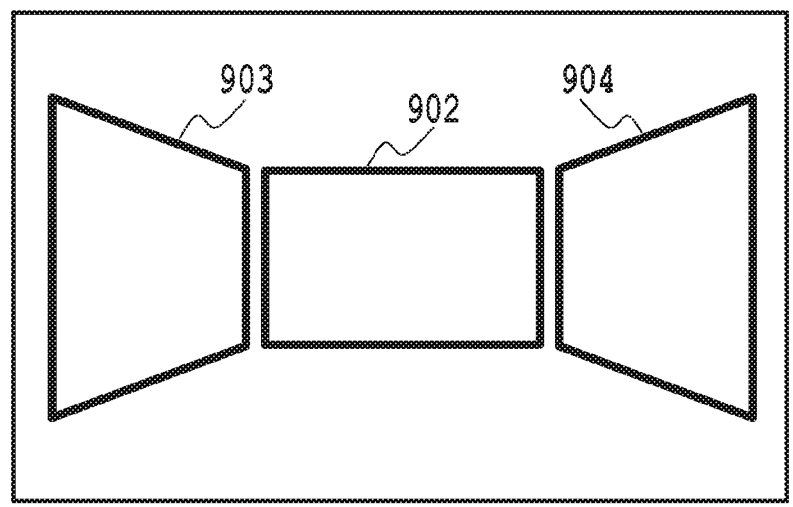
FIG. 2B is a diagram for explaining display ranges of the display system.

FIG. 2A shows a captured image 901 to be displayed on the screens of the display system described above. FIG. 2B shows display ranges 902 to 904 to be clipped from the image in the case of displaying a part of the image on each screen of the display system described above.

Regarding the shapes of the display ranges, for example, in a case where the three screens of the same size are arranged side by side, all the display ranges 902 to 904 are rectangles of the same size. However, in a case where the three screens are arranged side by side, high reality video experience cannot be realized. In order to realize higher reality video experience, it is preferable to arrange the screens so as to cover a viewer's field of view as described above. That is, it is preferable to arrange the left side screen 802 and the right side screen 803 at an angle with respect to the center screen 801 like the display system shown in FIG. 1.

Figure 3A:
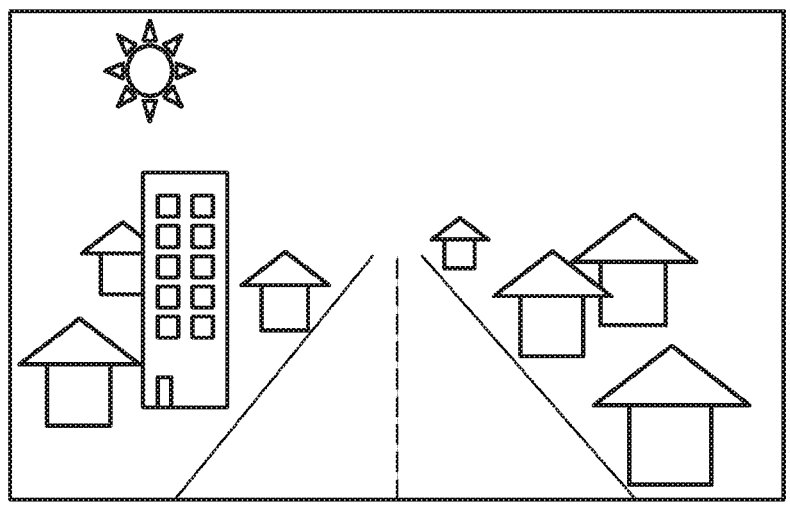
FIG. 3A is a diagram showing an example of the display ranges.
Figure 3B:
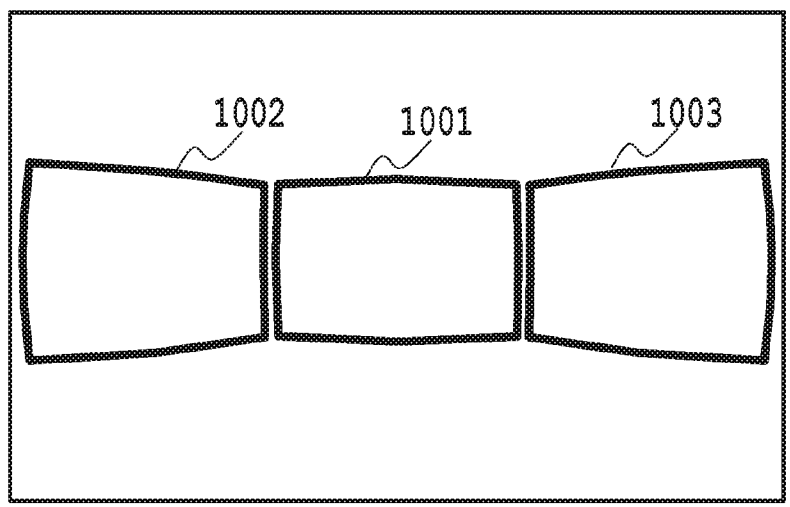
FIG. 3B is a diagram showing an example of the display ranges.

In the case of arranging the screens so as to cover a viewer's field of view, however, the display range 902 is rectangular, whereas the display range 903 and the display range 904 are trapezoidal as shown in FIG. 2B. In addition, the shapes of the display ranges 902 to 904 also vary depending on a projection method of a lens used for capturing the captured image 901. FIG. 2B shows the display ranges in the case of a general center projection lens. For example, in the case of using a fisheye lens of equidistant projection, display ranges 1001 to 1003 have shapes more roundish than those in the case of the center projection lens as shown in FIG. 3B.

Figure 2C:
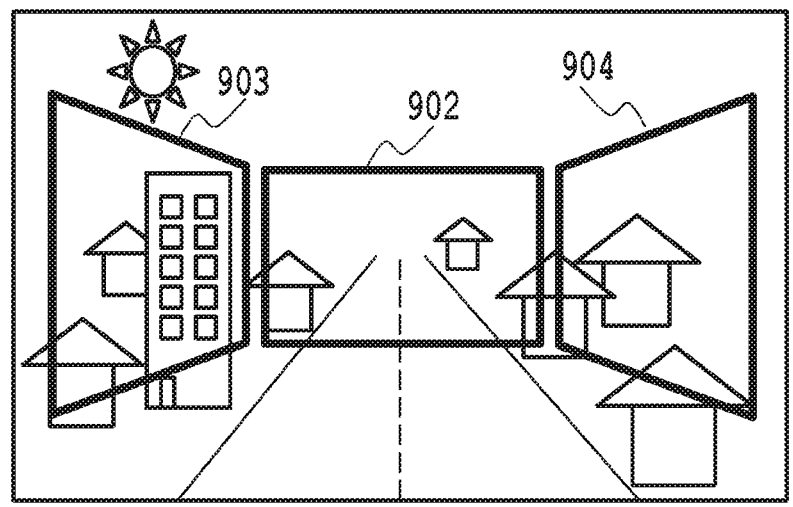
FIG. 2C is a diagram for explaining display ranges of the display system.

As described above, in the case of superimposing the captured image 901 shown in FIG. 2A on the display ranges 902 to 904 of the screens shown in FIG. 2B based on the premise that the display range 903 and the display range 904 are trapezoidal, the display is as shown in FIG. 2C.

An image capturer captures an image while confirming an image to be captured and distribution information on the image to be captured, which are displayed on a display unit of the image capturing apparatus such as an electronic viewfinder (EVF) or a monitor, and adjusting image capturing conditions such as an angle of view, white balance, and exposure. This enables the image capturer to confirm a range of the image to be captured at that time and distribution information of pixel values on the entire image. However, in the case of displaying the captured image 901 on the screens shown in FIG. 1, an image capturer cannot know what ranges in the captured image 901 will be displayed on the screens.

Accordingly, the image capturer cannot confirm distribution information of pixel values corresponding to the clipped ranges in the captured image and may adjust, for example, the color tone of the entire image based on the distribution information of pixel values on the entire image, which often interferes with appropriate settings of white balance and exposure in the actually clipped ranges. As a result, in a case where parts of the captured image 901 are clipped and displayed on the screens, there is a problem that a captured image desired by the image capturer cannot be appropriately displayed.

Therefore, in the embodiments described below, an image capturer is provided with distribution information of pixel values corresponding to clipped ranges of an image obtained by image capturing at the time of image capturing. More specifically, in image capturing, clipped ranges are calculated based on the configuration of a display apparatus and the mode of display, distribution information of pixel values corresponding to the clipped ranges is generated, and the generated distribution information is superimposed on an image obtained by image capturing and displayed.

This enables the image capturer to know distribution information of pixel values on ranges displayable by the display apparatus in the image obtained by image capturing. In the description below, a display apparatus or display system that displays a part of a captured image after image capturing will be referred to as a first display apparatus or first display system. An apparatus that displays an image on which distribution information is superimposed in image capturing will be referred to as a second display apparatus. In a case where a display unit of an image capturing apparatus is used as the second display apparatus, the display unit will be referred to as a second display unit.

First Embodiment

Hardware Configuration of Image Processing Apparatus

Figure 4:
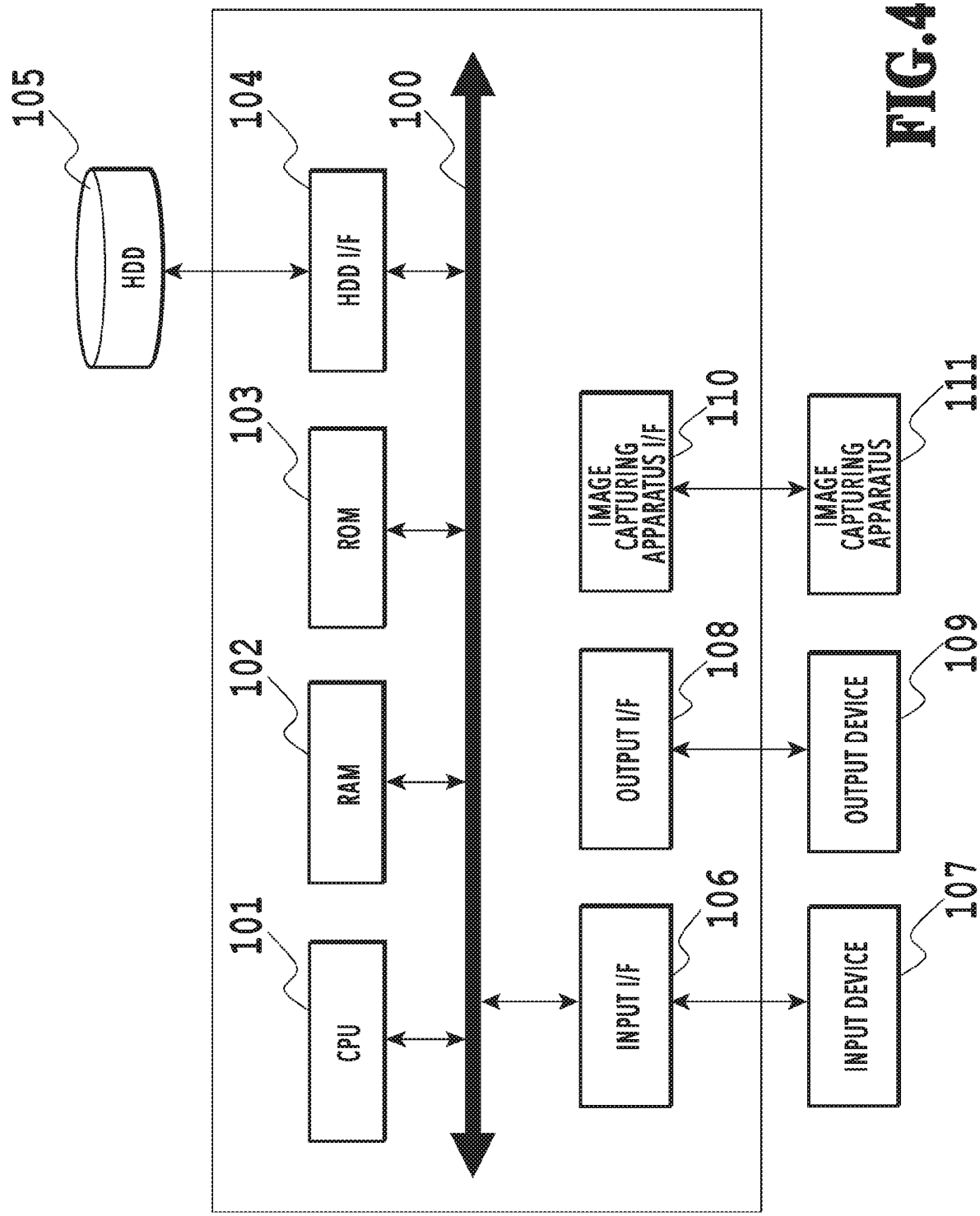
FIG. 4 is a diagram showing a hardware configuration of an image processing apparatus.

FIG. 4 is a diagram showing a hardware configuration of an image processing apparatus 1 which generates (outputs) data for displaying generated distribution information according to a display apparatus. The image processing apparatus 1 is, for example, a computer, and comprises a CPU 101, a RAM 102, a ROM 103, an HDD interface (I/F) 104, an input I/F 106, an output I/F 108, and an image capturing apparatus I/F 110.

The CPU 101 executes a program stored in the ROM 103 and the hard disk drive (HDD) 105 using the RAM 102 as a work memory and controls each block via a system bus 100. The HDD I/F 104 is an interface such as a serial ATA (SATA). The HDD I/F 104 is connected to a secondary storage device such as an HDD 105 or optical disk drive.

The CPU 101 can read data from the HDD 105 and write data to the HDD 105 via the HDD I/F 104. The CPU 101 can also load data stored in the HDD 105 into the RAM 102 and store the data loaded into the RAM 102 in the HDD 105. In addition, the CPU 101 can execute the data loaded into the RAM 102 as a program.

The input I/F 106 is a serial bus interface such as a Universal Serial Bus (USB) or IEEE1394. The input I/F 106 is connected to an input device 107 such as a keyboard or mouse. The CPU 101 can read data from the input device 107 via the input I/F 106.

The output I/F 108 is a video output interface such as a Digital Visual Interface (DVI) or a High-Definition Multimedia Interface (HDMI; registered trademark). The output I/F 108 is connected to an output device 109 such as a liquid crystal display. The output device 109 corresponds to the second display unit or second display apparatus described above. The CPU 101 transmits data to the output device 109 via the output I/F 108, thereby performing processing such as display.

The image capturing apparatus I/F 110 is a serial bus interface such as a USB. The image capturing apparatus I/F 110 is connected to an image capturing apparatus 111 such as a video camera. The CPU 101 can acquire image capturing data such as frame data on a moving image from the image capturing apparatus 111 via the image capturing apparatus I/F 110.

The image processing apparatus 1 does not necessarily comprise the image capturing apparatus I/F 110. In this case, instead of the image capturing apparatus I/F 110, the image capturing apparatus is connected to the input I/F 106. Alternatively, an image capturing apparatus into which the image capturing apparatus 111 and the output device 109 are integrated may be connected to the image capturing apparatus I/F 110. For example, a video camera comprising a display unit such as an EVF or monitor may be used as the image capturing apparatus 111. In this case, the CPU 101 can perform processing such as display by transmitting data to the display unit via the image capturing apparatus I/F 110.

Figure 5:
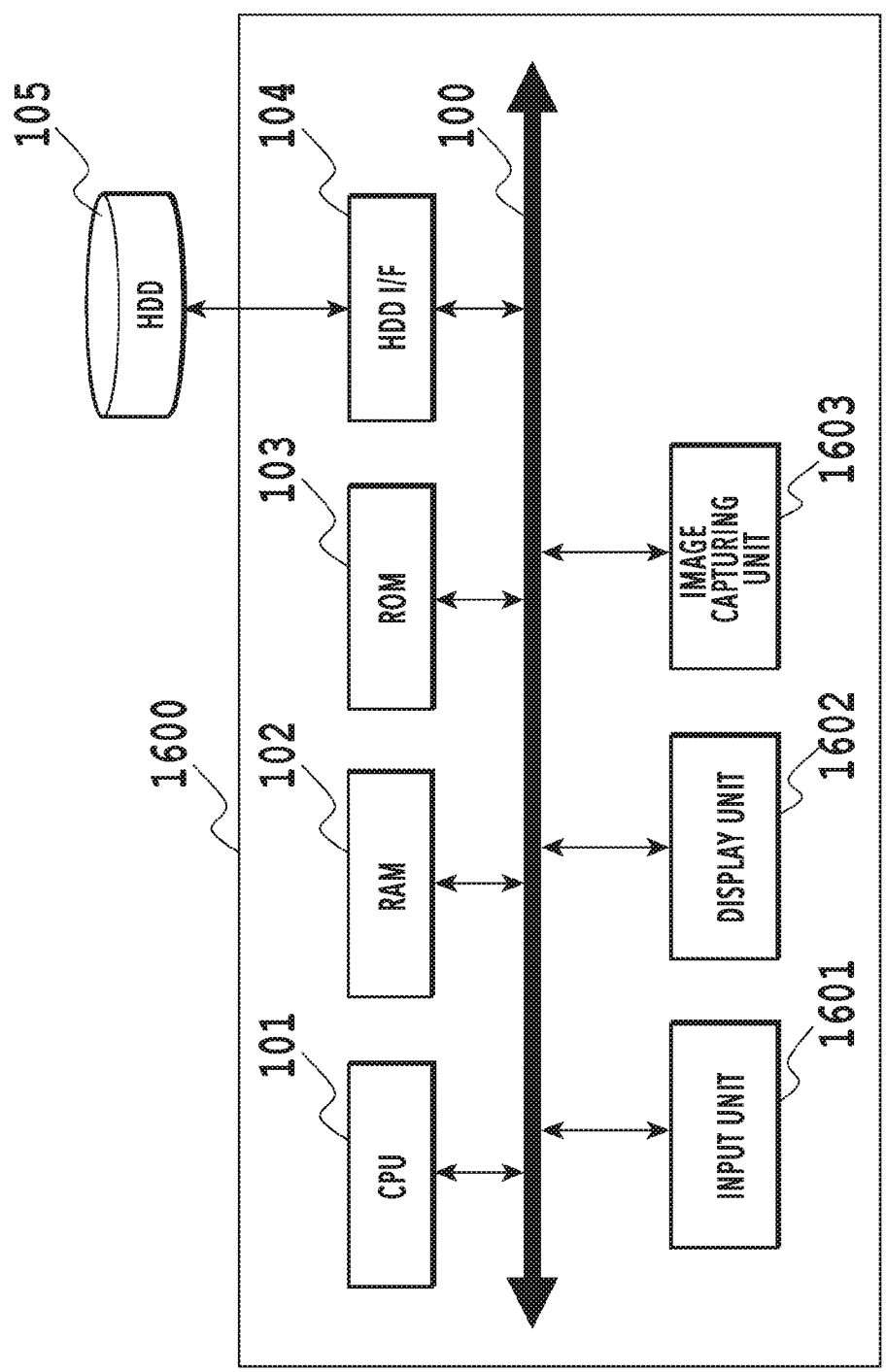
FIG. 5 is a diagram showing a hardware configuration of an image capturing system.

Further, the image processing apparatus 1 may be included in the output device 109 or the image capturing apparatus 111. For example, the image processing apparatus 1, the output device 109, and the image capturing apparatus 111 may be integrated into an image capturing system. FIG. 5 shows a hardware configuration of an image capturing system 1600. The image capturing system 1600 is, for example, a digital camera, and comprises the CPU 101, the RAM 102, the ROM 103, the HDD interface (I/F) 104, an input unit 1601, a display unit 1602, and an image capturing unit 1603.

The input unit 1601 is an input unit such as a button. The display unit 1602 is a display unit such as an EVF or monitor. The image capturing unit 1603 is an image capturing unit including an optical system such as a lens and configured to generate an image via the optical system. The image capturing system 1600 does not necessarily comprise the input unit 1601 and the display unit 1602 separately and may comprise a touch panel display or the like into which the input unit 1601 and the display unit 1602 are integrated. The image capturing system may be a portable information terminal such as a smartphone.

Functional Configuration of Image Processing Apparatus

Figure 6:
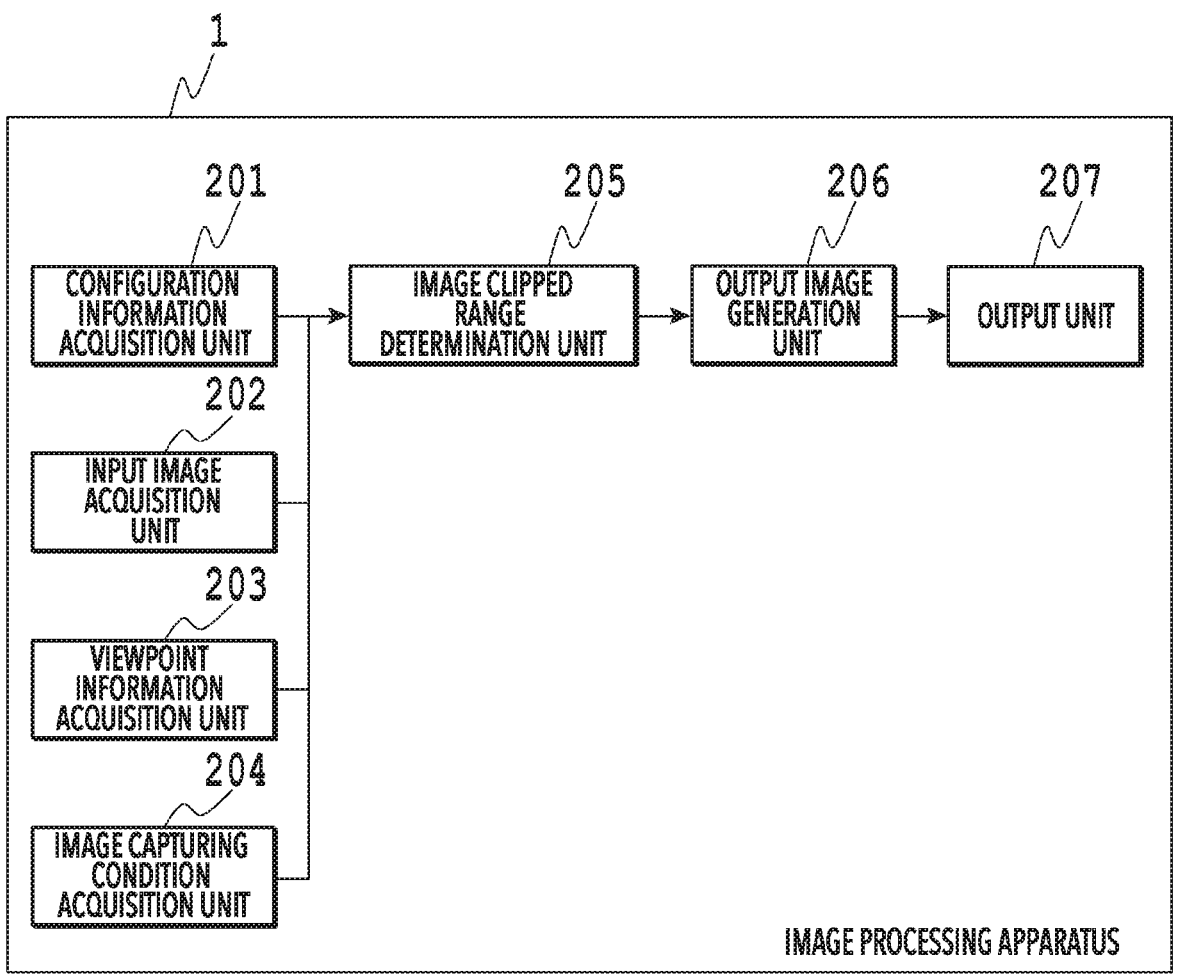
FIG. 6 is a block diagram showing a functional configuration of the image processing apparatus.

Next, a functional configuration of the image processing apparatus 1 will be described. FIG. 6 is a block diagram showing a functional configuration of the image processing apparatus 1. The CPU 101 reads a program stored in the ROM 103 or HDD 105 and executes it using the RAM 102 as a work area, thereby functioning as the functional configuration shown in FIG. 6. Not all the processes described below should be executed by the CPU 101. The image processing apparatus 1 may be configured such that some or all of the processes are executed by one or more processing circuits other than the CPU 101.

The image processing apparatus 1 comprises a configuration information acquisition unit 201, an input image acquisition unit 202, a viewpoint information acquisition unit 203, an image capturing condition acquisition unit 204, an image clipped range determination unit 205, an output image generation unit 206, and an output unit 207.

The configuration information acquisition unit 201 acquires configuration information indicating a configuration of the first display system which displays an image. The configuration information on the first display system includes information about the number of screens of the first display system, the size of each screen, and the resolution of each screen, and arrangement information indicating the position and orientation of each screen.

The input image acquisition unit 202 is an example of an image data acquisition unit and acquires input image data indicating an input image. The input image is an image to be displayed with distribution information of pixel values corresponding to a clipped range superimposed thereon. The viewpoint information acquisition unit 203 acquires viewpoint information indicating the position of a viewpoint in the case of observing an image displayed by the first display system. The image capturing condition acquisition unit 204 acquires image capturing information indicating image capturing conditions. The image capturing information includes the sensor size of the image capturing apparatus 111, the focal length of a lens, an angle of view, a projection method, and the resolution of an input image.

The image clipped range determination unit 205 determines a range to be clipped from an input image. The output image generation unit 206 generates an image with distribution information obtained by superimposing distribution information of pixel values on an input image as image data with distribution information (that is, the output image generation unit 206 is an example of an image data generation unit). In the description below, an image with distribution information and image data with distribution information will also be referred to as an output image and output image data, respectively. The output unit 207 outputs the output image data (image data with distribution information) to the output device 109.

Processing Performed by Image Processing Apparatus

Figure 7:
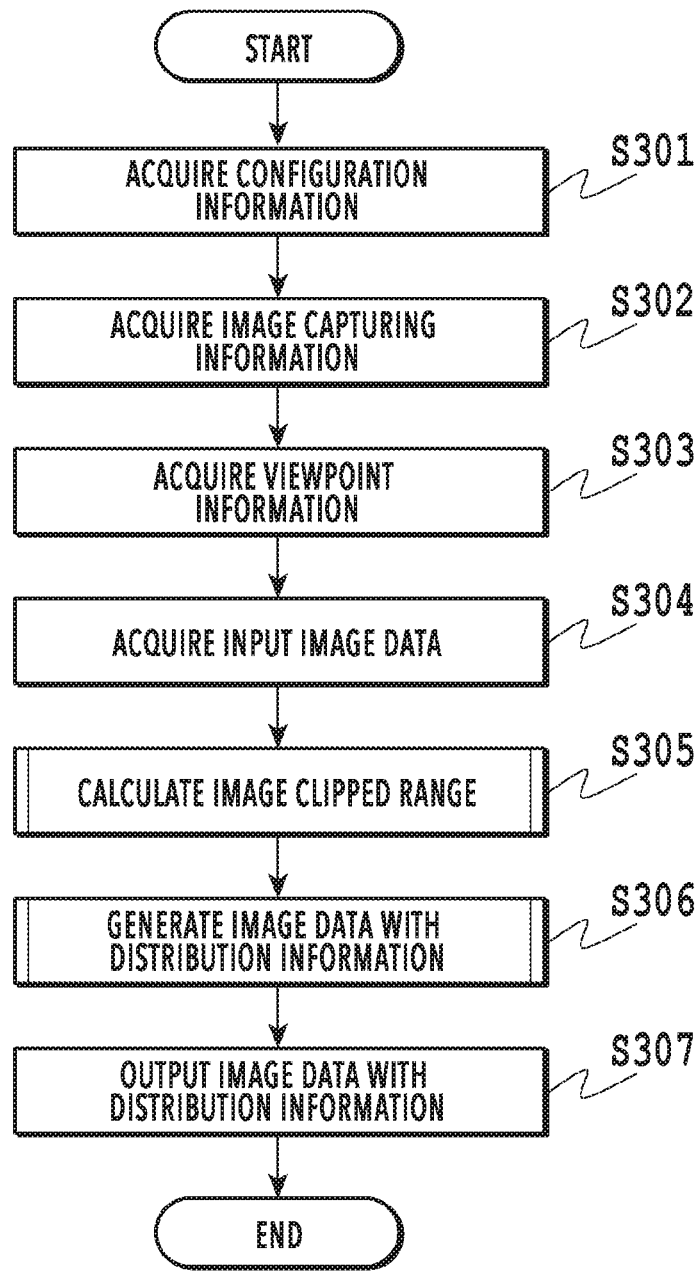
FIG. 7 is a flowchart showing a procedure of processing executed by the image processing apparatus.

Next, the procedure of processing executed by the image processing apparatus 1 will be described with reference to the flowchart of FIG. 7. In the description of the flowchart, sign "S" indicates a step.

In S301, the configuration information acquisition unit 201 acquires configuration information indicating a configuration of the first display system which displays an image. The processing in S301 is executed based on a user instruction via the input device 107. In the present embodiment, the configuration information is acquired by selecting one of a plurality of types of configuration information prestored in the HDD 105 based on a user instruction.

For a supplementary explanation of the configuration information, FIG. 1 shows the first display system of the present embodiment. As shown in FIG. 1, the first display system comprises the three screens and the three projectors. In the first display system, the left side screen 802 and the right side screen 803 are arranged at the spread angle α with respect to the center screen 801.

Each screen has a width $W_{mm}$ and a height $H_{mm}$ and the three screens are equal in size. Images are projected on the screens using the respective projectors, each of which is arranged so as to display an image having a resolution of $W_{pix} \times H_{pix}$.

Although not shown in FIG. 1, the three projectors are piled and arranged directly above a viewpoint position and each project an image on the corresponding screen. The position of an image projected by each projector is adjusted by the lens shift function or keystone correction function of the projector.

In the case of the first display system shown in FIG. 1, the configuration information indicates that the number of screens is 3, the size of each screen is the width $W_{mm}$ and the height $H_{mm}$, and the resolution of each screen is $W_{pix} \times H_{pix}$. In the present embodiment, the resolution of each screen can be read as the resolution of a projector that projects an image on each screen.

In the configuration information, the screen arrangement information is represented by the position (x, y, z) of the center of a screen in a three-dimensional XYZ coordinate system and a normal vector N indicating the direction of a normal on the surface of the screen. The normal is a normal on a surface on the side of the viewpoint observing the screen. The origin of the XYZ coordinate system is the viewpoint position indicated by the viewpoint information.

As described above, images clipped from an input image are displayed on the respective screens arranged as shown in FIG. 1, whereby a viewer can be provided with video of a wider field of view than that in the case of displaying video using a single screen. In addition, since not irrelevant images on the respective screens, but one interlinked image on the plurality of screens are displayed on the respective screens, the display is close to a viewer's field of view. The screen configuration described above is only an example and the number of screens, size, arrangement and the like are not limited to those described above.

In S302, the image capturing condition acquisition unit 204 acquires image capturing information indicating image capturing conditions. The processing in S302 is executed based on a user instruction via the input device 107. In the present embodiment, image capturing information is acquired by selecting one of a plurality of image capturing conditions prestored in the HDD 105 for each item based on a user instruction.

In the image capturing information, the sensor size of the image capturing apparatus 111 is a width $SW_{mm}$ and a height $SH_{mm}$, the focal length of a lens is f, an angle of view is $\theta_{max}$, and the resolution of an input image is $SW_{pix} \times SH_{pix}$. Since the lens of the image capturing apparatus 111 of the present embodiment is a fisheye lens of equidistant projection, the projection method is equidistant projection.

In S303, the viewpoint information acquisition unit 203 acquires viewpoint information indicating the position of a viewpoint in the case of observing an image displayed by the first display system. The processing in S303 is executed by a user instruction via the input device 107. In the present embodiment, the viewpoint information is acquired by selecting one of viewpoint information indicating viewpoint positions prestored in the HDD 105 based on a user instruction.

The viewpoint information is represented by the position (0, 0, 0) of a viewpoint in the three-dimensional XYZ coordinate system described above. In the present embodiment, as shown in FIG. 1, the viewpoint is located in a position apart from the center of the center screen 801 by the distance $D_{view}$ in the direction orthogonal to the center screen 801. However, the position of the viewpoint is not necessarily limited to this.

In S304, the input image acquisition unit 202 acquires input image data from the image capturing apparatus 111. More specifically, the input image acquisition unit 202 stores input image data in the RAM 102 via the image capturing apparatus I/F 110. In the present embodiment, since the image capturing apparatus 111 is a video camera, the subsequent processing will be executed using image data corresponding to each frame of a moving image as input image data.

In S305, the image clipped range determination unit 205 determines a range to be clipped from an input image by clipping processing, that is, a range to be displayed by the first display system. The processing in this step will be described later with reference to FIG. 8.

In S306, the output image generation unit 206 generates distribution information of pixel values corresponding to the range to be clipped determined in S305 and superimposes the generated distribution information on the input image data acquired in S304, thereby generating image data with distribution information. The processing in this step will be described later with reference to FIG. 12. In S307, the output unit 207 outputs the image data with distribution information generated in S306 to the output device 109 via the output I/F 108.

Processing of Image Clipped Range Determination Unit 205 in S305

Figure 8:
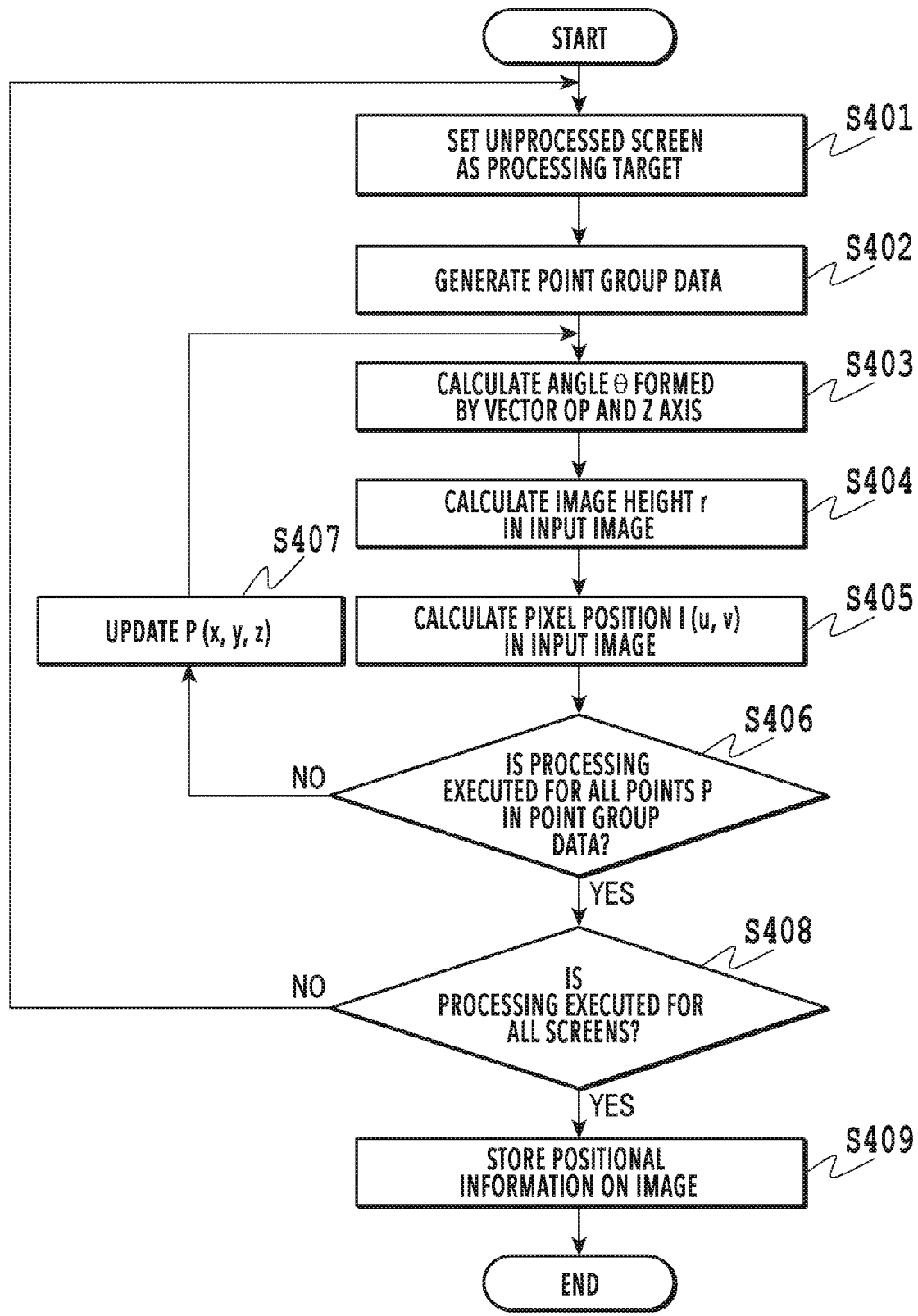
FIG. 8 is a flowchart showing a procedure of processing executed by an image clipped range determination unit.

FIG. 8 is a flowchart showing a procedure of processing executed by the image clipped range determination unit in S305. In the processing in S305, in order to display images on the three screens forming the first display system shown in FIG. 1, clipped ranges in an input image corresponding to the respective screens are sequentially calculated. Each step of the flowchart of FIG. 8 will be described below.

In S401, the image clipped range determination unit 205 sets a screen for which the subsequent processing from S402 to S407 is not executed as a processing target. In this case, the three screens shown in FIG. 1 are sequentially set as a processing target.

In S402, the image clipped range determination unit 205 specifies positions (points) corresponding to an edge portion of an image display area on a screen at predetermined intervals based on the screen size and screen arrangement information, and calculates three-dimensional coordinates of each of the specified points P. More specifically, the output image generation unit 206 generates three-dimensional coordinates (x, y, z) of each point P as point group data. The three-dimensional coordinates used here are three-dimensional coordinates using the viewpoint position observing the screen as the origin.

In the present embodiment, an interval between the points P is determined based on the resolution of the screen. As described above, the size of the screen is the width $W_{mm}$ and the height $H_{mm}$ and the resolution of the screen is $W_{pix} \times H_{pix}$. Thus, based on the size and resolution, three-dimensional coordinates of the center point of each pixel on the screen are calculated. Out of the three-dimensional coordinates of the center points of the respective pixels, all three-dimensional coordinates of pixels corresponding to the edge portion of the image display area are generated as point group data on the processing target.

Figure 9A:
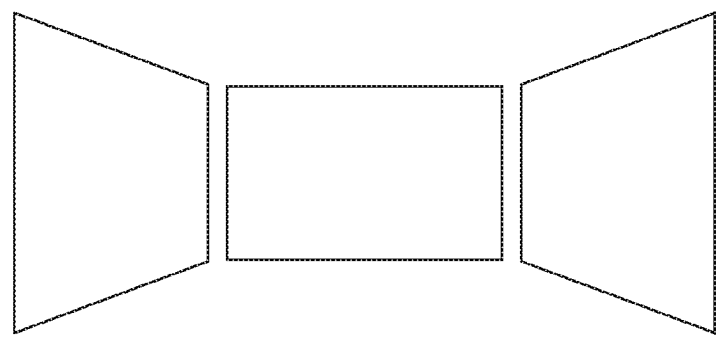
FIG. 9A is a diagram showing positions of edges of image display areas in screens.
Figure 9B:
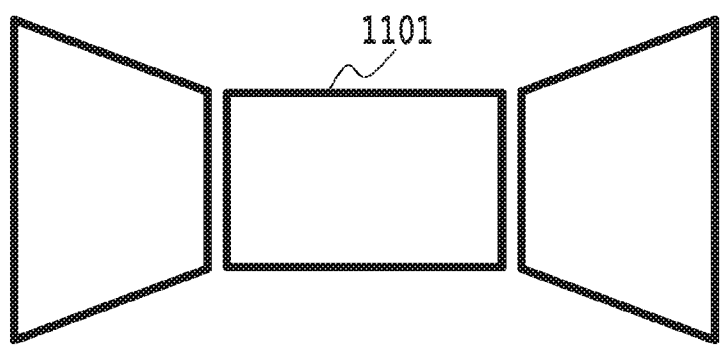
FIG. 9B is a diagram showing positions of edges of image display areas in screens.

FIG. 9 is a diagram showing the positions of edges of image display areas on the screens. FIG. 9A shows the three screens in FIG. 1 observed from the viewpoint position in front of the center screen 801. As described above, since the entire screen is an image display area in the present embodiment, the positions of the edges in the image display areas on the screens are positions indicated by thick lines 1101 in FIG. 9B.

Figure 9C:
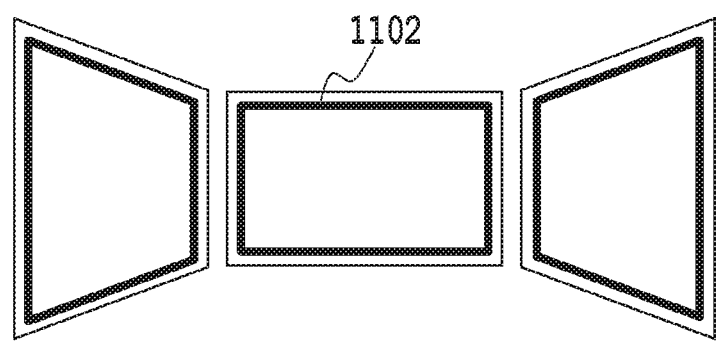
FIG. 9C is a diagram showing positions of edges of image display areas in screens.

However, the entire screen is not necessarily used as an image display area. For example, as shown by thick lines 1102 in FIG. 9C, the edges of the image display areas may be positioned (set) inside the edges of the screens. In the case of displaying images as shown in FIG. 9C, the output image generation unit 206 generates point group data based on the screen arrangement information and information that enables calculation of the sizes of the image display areas on the screens.

In S403, the image clipped range determination unit 205 extracts one point P (x, y, z) from the point group data and calculates an angle θ formed by a vector OP and a Z axis in the case of using the viewpoint position as the origin O with respect to the extracted point P by the following formula (1):
θ

$$\theta = \cos^{-1}\left(\frac{z}{\sqrt{x^2 + y^2 + z^2}}\right) \quad \text{Formula (1)}$$

Figure 10A:
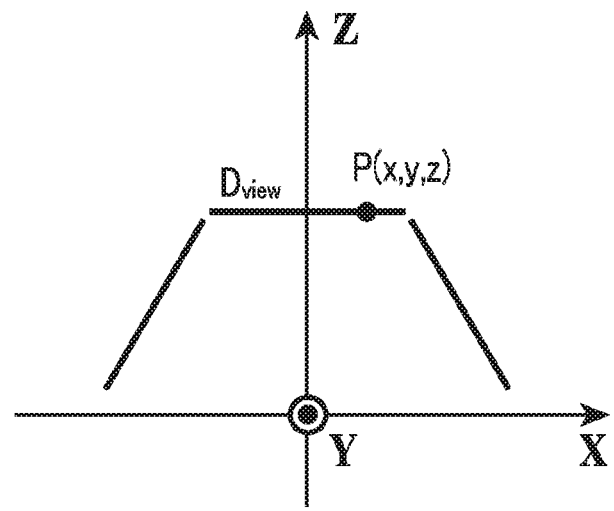
FIG. 10A is a diagram showing a three-dimensional space coordinate system.
Figure 10B:
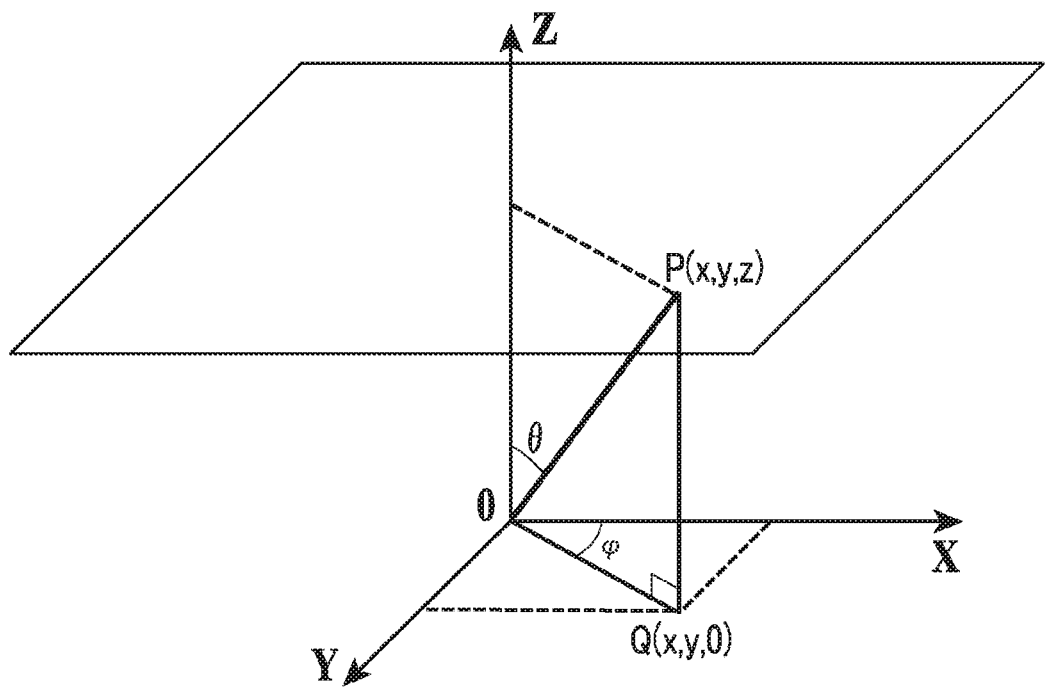
FIG. 10B is a diagram showing a three-dimensional space coordinate system.

A supplementary explanation will be given of the three-dimensional space coordinate system in the present embodiment with reference to FIG. 10. FIG. 10A is a diagram showing the three screens on the three-dimensional coordinates using the viewpoint position as the origin. In FIG. 10, the point P (x, y, z) indicates three-dimensional coordinates of a point on the screen to be processed. FIG. 10B is a diagram showing FIG. 10A from another angle. As described above, an angle formed by the vector OP and the Z axis is defined as θ. In addition, a foot of a perpendicular from the point P to an XP plane is defined as a point Q (x, y, 0) and an angle formed by a vector OQ and an X axis is defined as φ.

In S404, the image clipped range determination unit 205 determines a point in an input image corresponding to the point P (x, y, z) as I (u, v) and calculates an image height r at the point I on the input image by the following formula (2). In the present embodiment, since the input image is acquired at an angle of view $\theta_{max}$ by the fisheye lens of equidistant projection, the image height r can be represented by a ratio between θ and $\theta_{max}$ as shown by the following formula:

$$r = \frac{\theta}{\theta_{max}} \quad \text{Formula (2)}$$

Figure 11:
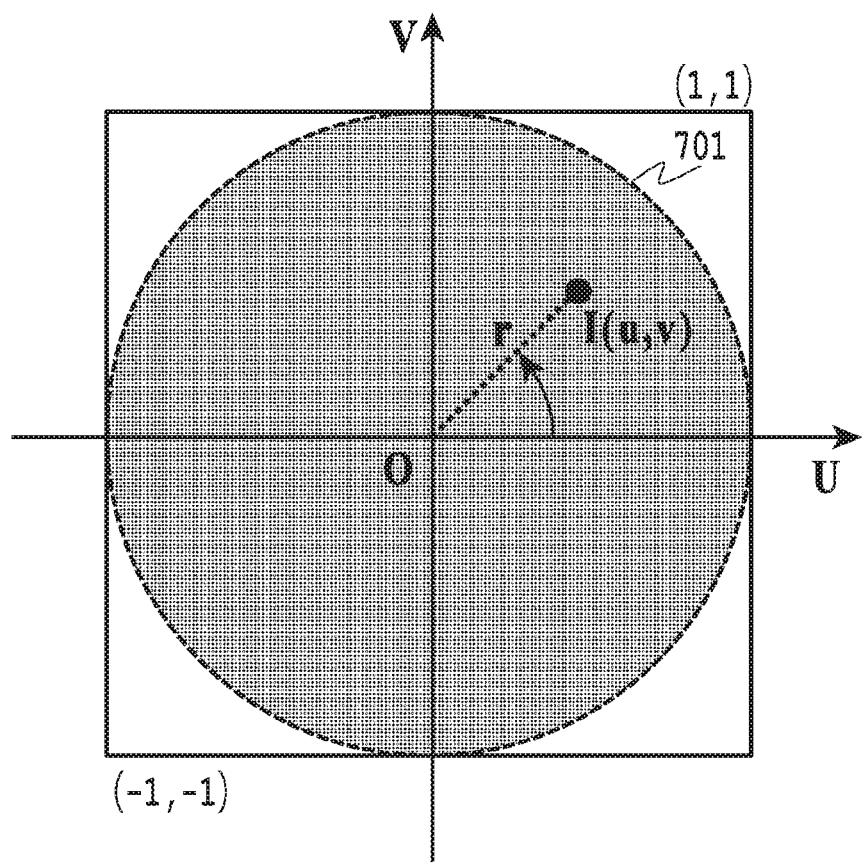
FIG. 11 is a diagram showing a two-dimensional UV coordinate system.

FIG. 11 is a diagram showing the point I (u, v) in the input image in a two-dimensional UV coordinate system. In FIG. 11, normalization is performed such that the center of the input image is the origin, lower left coordinates of the image are (−1, −1), and upper right coordinates are (1, 1). An angle φ formed by a vector OI and a U axis is equal to the angle φ formed by the vector OQ and the X axis in FIG. 10B. In the present embodiment, since the fisheye lens is used, a range actually displayed as video is an area inside an image circle 701 shown in FIG. 11.

In S405, the image clipped range determination unit 205 calculates coordinates (u, v) of the point I on the input image by the following formula (3) and formula (4):

$$u = r\cos\varphi = \frac{x}{\sqrt{x^2 + y^2}} r \quad \text{Formula (3)}$$

$$v = r\sin\varphi = \frac{y}{\sqrt{x^2 + y^2}} r \quad \text{Formula (4)}$$

In S406, the image clipped range determination unit 205 determines whether the processing from S403 to S405 described above has been executed for all the points P of the point group data corresponding to the screen to be processed. The image clipped range determination unit 205 moves the processing to S408 in a case where the processing has been executed for all the points P and moves the processing to S407 in a case where the processing has not been executed for all the points P.

In S407, the image clipped range determination unit 205 updates the coordinates of the point P to an unprocessed point of the point group data and moves the processing to S403. In S408, the image clipped range determination unit 205 determines whether all the screens forming the first display system have been set as a processing target. That is, in the present embodiment, it is determined whether each of the three screens, the center screen 801, the left side screen 802, and the right side screen 803, has been set as a processing target.

The image clipped range determination unit 205 moves the processing to S409 in a case where all the screens have been set as a processing target and returns the processing to S401 in a case where not all the screens have been set as a processing target. In S409, the image clipped range determination unit 205 stores coordinate values indicating screen edge information calculated in the processing from S401 to S408 as clipped range information and finishes the processing shown in FIG. 8. The processing from S401 to S409 described above enables determination of a clipped range having a shape depending on the configuration of the first display system, the type of optical system of the image capturing apparatus 111, and the like.

Processing of Output Image Generation Unit 206 in S306

Figure 12:
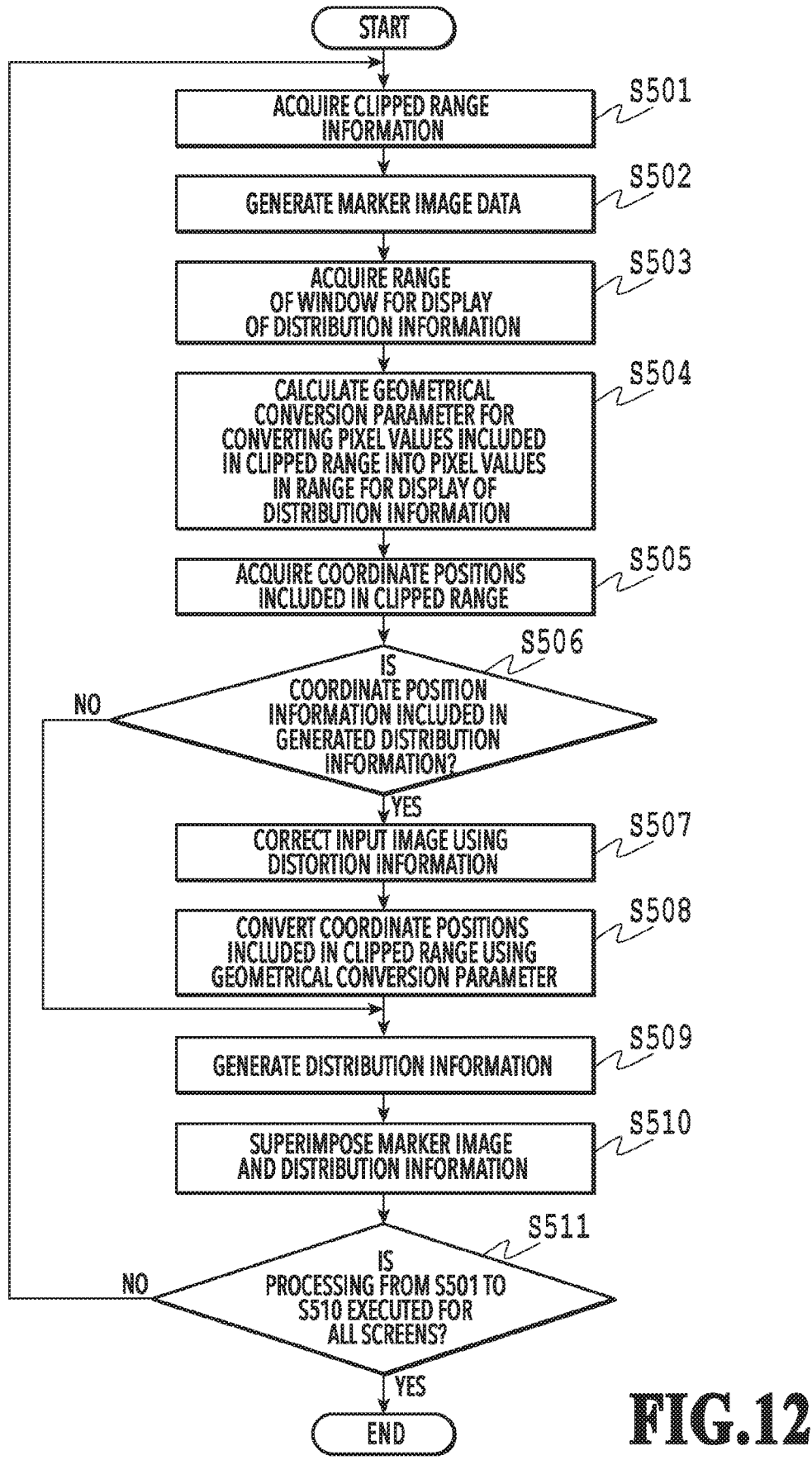
FIG. 12 is a flowchart showing a procedure of processing executed by an output image generation unit.

FIG. 12 is a flowchart showing a procedure of processing executed by the output image generation unit in S306. In S501, the output image generation unit 206 acquires pixel position information corresponding to the clipped range indicated by edge information on each screen calculated in S305.

In S502, the output image generation unit 206 generates marker image data from pixel values corresponding to the clipped range shown in the edge coordinates of the screen acquired in S501. The output image generation unit 206 generates marker image data having the same resolution as the input image data in the RAM 102 and initializes all the pixel values by white. In the present embodiment, the marker image data is binary data in which a pixel value can take either 0 (white) or 1 (black). In addition, the output image generation unit 206 converts pixel values corresponding to the edge coordinates from 0 to 1.

More specifically, since the coordinates have fractional values between −1.0 and 1.0, each of u and v is normalized by addition of 1 followed by division by 2 to take a value from 0 to 1.0. Information indicating the positions of pixels on a marker image is calculated by further multiplying u by the width $SW_{pix}$ of the marker image and multiplying v by the height $SH_{pix}$ of the marker image. Finally, processing of changing a pixel value to black is executed for the closest pixel out of four pixels close to (u, v).

In S503, the output image generation unit 206 acquires a range of a window in which distribution information is displayed. In the present embodiment, a rectangular window having a width W/2pix and a height H/2pix, which are ½ of the marker image, is acquired as a range of a window in which distribution information is displayed.

In S504, the output image generation unit 206 calculates a geometrical conversion parameter for converting pixel values included in the clipped range acquired in S501 into pixel values within the range in which distribution information is displayed. In the present embodiment, first, it is assumed that upper left coordinates of the clipped range are (x1, y1), upper right coordinates are (x2, y2), lower right coordinates are (x3, y3), and lower left coordinates are (x4, y4). Next, on the assumption that upper left coordinates of the display range of the distribution information are (X1, Y1), upper right coordinates are (X2, Y2), lower right coordinates are (X3, Y3), and lower left coordinates are (X4, Y4), a matrix of projective transformation of the formula (5) is calculated:

$$\begin{bmatrix} X1 \\ X2 \\ X3 \\ X4 \\ Y1 \\ Y2 \\ Y3 \\ Y4 \end{bmatrix} = \begin{bmatrix} x1 & y1 & 1 & 0 & 0 & 0 & -X1x1 & -X1y1 \\ x2 & y2 & 1 & 0 & 0 & 0 & -X2x2 & -X2y2 \\ x3 & y3 & 1 & 0 & 0 & 0 & -X3x3 & -X3y3 \\ x4 & y4 & 1 & 0 & 0 & 0 & -X4x4 & -X4y4 \\ 0 & 0 & 0 & x1 & y1 & 1 & -Y1x2 & -Y1y1 \\ 0 & 0 & 0 & x2 & y2 & 1 & -Y2x2 & -Y2y2 \\ 0 & 0 & 0 & x3 & y3 & 1 & -Y3x3 & -Y3y3 \\ 0 & 0 & 0 & x4 & y4 & 1 & -Y4x4 & -Y4y4 \end{bmatrix} \begin{bmatrix} a \\ b \\ c \\ d \\ e \\ f \\ g \\ h \end{bmatrix}$$ Formula (5)

In S505, the output image generation unit 206 acquires coordinate positions included in the clipped range. More specifically, the output image generation unit 206 acquires coordinate positions surrounded by the edge area indicating the clipped range acquired in S501.

In S506, the output image generation unit 206 determines whether the generated distribution information includes information about coordinate positions. The output image generation unit 206 moves the processing to S507 in a case where it is determined that the generated distribution information includes information about coordinate positions and moves the processing to S509 in a case where it is determined that the generated distribution information does not include information about coordinate positions.

Figure 13A:
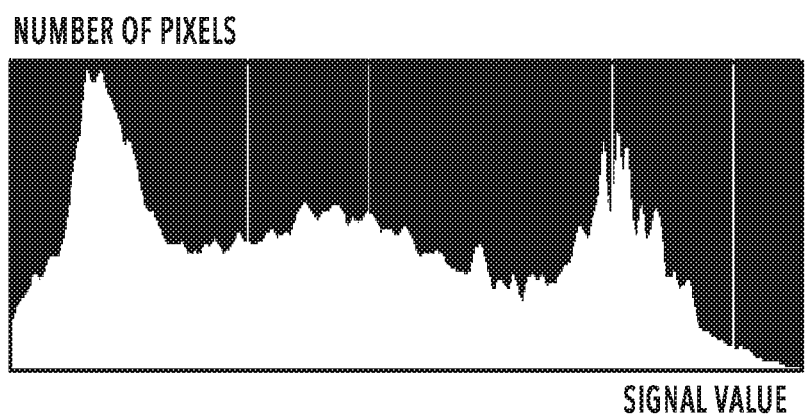
FIG. 13A is a diagram showing distribution information.
Figure 13B:
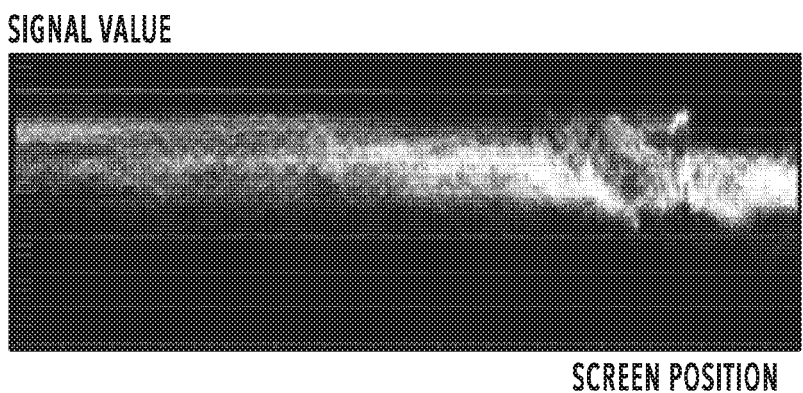
FIG. 13B is a diagram showing distribution information.
Figure 13C:
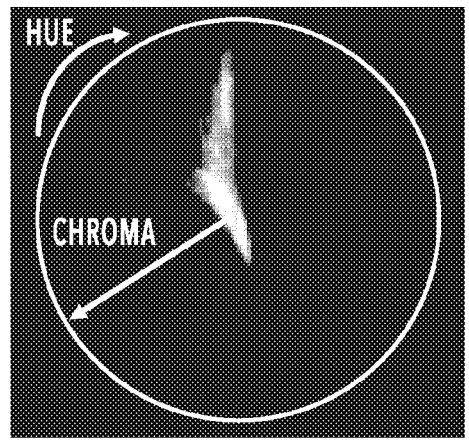
FIG. 13C is a diagram showing distribution information.

In the present embodiment, a luminance histogram (frequency distribution of luminance) or a waveform signal is generated as distribution information. Alternatively, a histogram of each pixel value, a chromaticity parade, or the like may be generated as distribution information. FIG. 13A shows a luminance histogram and FIG. 13B shows a waveform signal. In the luminance histogram of FIG. 13A, the horizontal axis represents a signal value of a pixel and the vertical axis represents the number of pixels having the pixel signal. In the waveform signal of FIG. 13B, the horizontal axis represents a line coordinate position on the screen and the vertical axis represents a signal value of a pixel value at the position. As a supplement, a chromaticity parade is shown in FIG. 13C. The chromaticity parade of FIG. 13C indicates hue by an angle and indicates chroma by a distance from the center, whereby a chromaticity distribution of a signal value can be confirmed.

The distribution information is selected based on a user instruction via the input device 107. In the case of displaying distribution information, one or more types of distribution information are selected. In the present embodiment, distribution information is acquired by selecting one of a plurality of types of distribution information prestored in the HDD 105 based on a user instruction.

In a case where the waveform signal is selected as distribution information, that is, in a case where distribution information includes information about coordinate positions, it is necessary to appropriately inform a user of positional information. Thus, for the distribution information including information about coordinate positions, a correction of distortion of the input image (S507) and a geometrical conversion to a display range (S508) are executed.

In S507, since distortion occurs in the input image, the output image generation unit 206 corrects the input image based on distortion information on the lens in use. In the present embodiment, distortion information at the time of image capturing by the lens in use is prestored in the HDD 105 as a look-up table. The input image is corrected by referring to the look-up table. The look-up table describes correspondences between coordinate positions before and after the correction.

In S508, the output image generation unit 206 uses the geometrical conversion parameter calculated in S504 to convert the coordinate positions included in the clipped range. In a case where the coordinate positions include a decimal point, the closest pixel among the close four pixels is referred to.

In S509, the output image generation unit 206 generates distribution information selected by a user from the coordinate positions converted in S508 in a case where positional information is included in the distribution information, and generates it from signal values of pixel values of the input image corresponding to the coordinate positions in S505 in a case where positional information is not included.

Figure 14A:
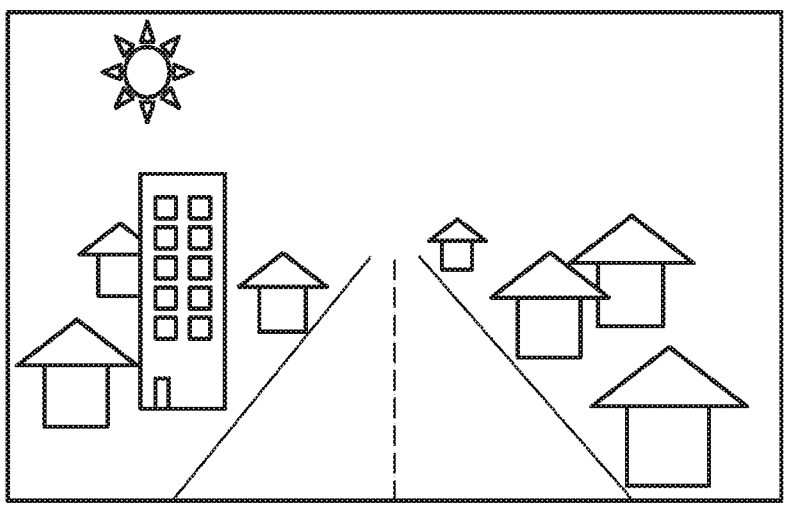
FIG. 14A is a diagram showing an image obtained by superimposing distribution information images on an input image.
Figure 14B:
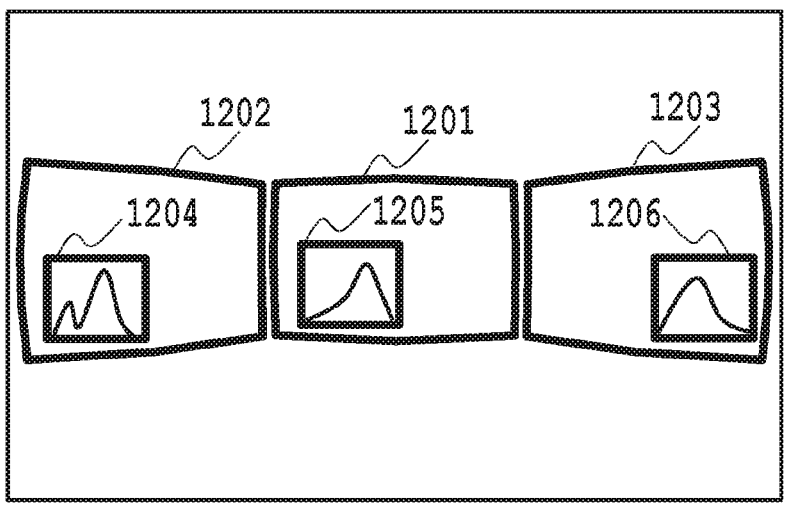
FIG. 14B is a diagram showing an image obtained by superimposing distribution information images on an input image.
Figure 14C:
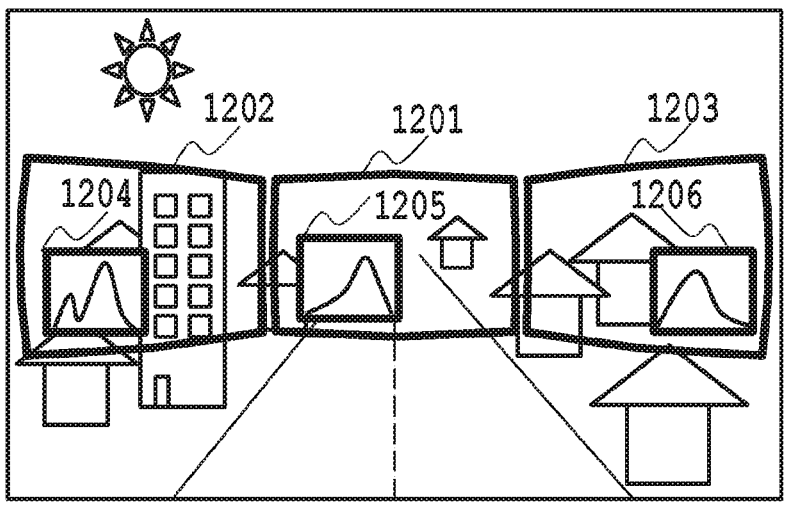
FIG. 14C is a diagram showing an image obtained by superimposing distribution information images on an input image.

In S510, the output image generation unit 206 executes processing of superimposing the marker image and the distribution information image on the input image. A supplementary explanation will be given of the processing in S510 with reference to FIG. 14. In FIG. 14, FIG. 14A shows the input image and FIG. 14B shows the marker images and distribution information images. FIG. 14C shows an image obtained by superimposing the marker images and distribution information images in FIG. 14B on the input image in FIG. 14A. That is, FIG. 14C shows a clipped range (a respective one of reference numerals 1201-1203) corresponding to each screen and distribution information (a corresponding one of reference numerals 1204-1206) on the image within the range. As shown in FIG. 14C, in the present embodiment, the distribution information is associated with each screen and superimposed and displayed within the clipped range.

In S511, the output image generation unit 206 determines whether the processing from S501 to S510 has been completed for all the screens. In a case where the processing from S501 to S510 has not been completed for all the screens, the output image generation unit 206 returns the processing to S501 to execute the processing for an unprocessed screen. In a case where the processing from S501 to S510 has been completed for all the screens, the output image generation unit 206 finishes the processing in S306.

As described above, according to the image processing apparatus of the present embodiment, it is possible to generate (provide) distribution information on an image capturing signal suitable for a display apparatus which displays part of video obtained by image capturing. This enables an image capturer to set exposure and white balance appropriately at the time of image capturing by referring to the provided distribution information.

Second Embodiment

In the first embodiment described above, the description has been given of the method of generating distribution information of pixel values within the clipped range, superimposing the generated distribution information on the clipped range, and displaying them. In the present embodiment, a description will be given of a method of allowing a user to select a method of superimposing distribution information on an input image from among a plurality of methods.

Since a hardware configuration of an image processing apparatus of the present embodiment is the same as that of the first embodiment described above, the description thereof will be omitted. Similarly, since the processing executed by the image processing apparatus is the same as that in the first embodiment described above except for the processing in S306 (more specifically, S510), the description thereof will be omitted and a description will be given of a method of adding (superimposing) the distribution information images to (on) the input image in S510. Further, as mentioned above, the same reference numerals are assigned to the same features as the first embodiment.

Operation of Output Image Generation Unit 206

Figure 15:
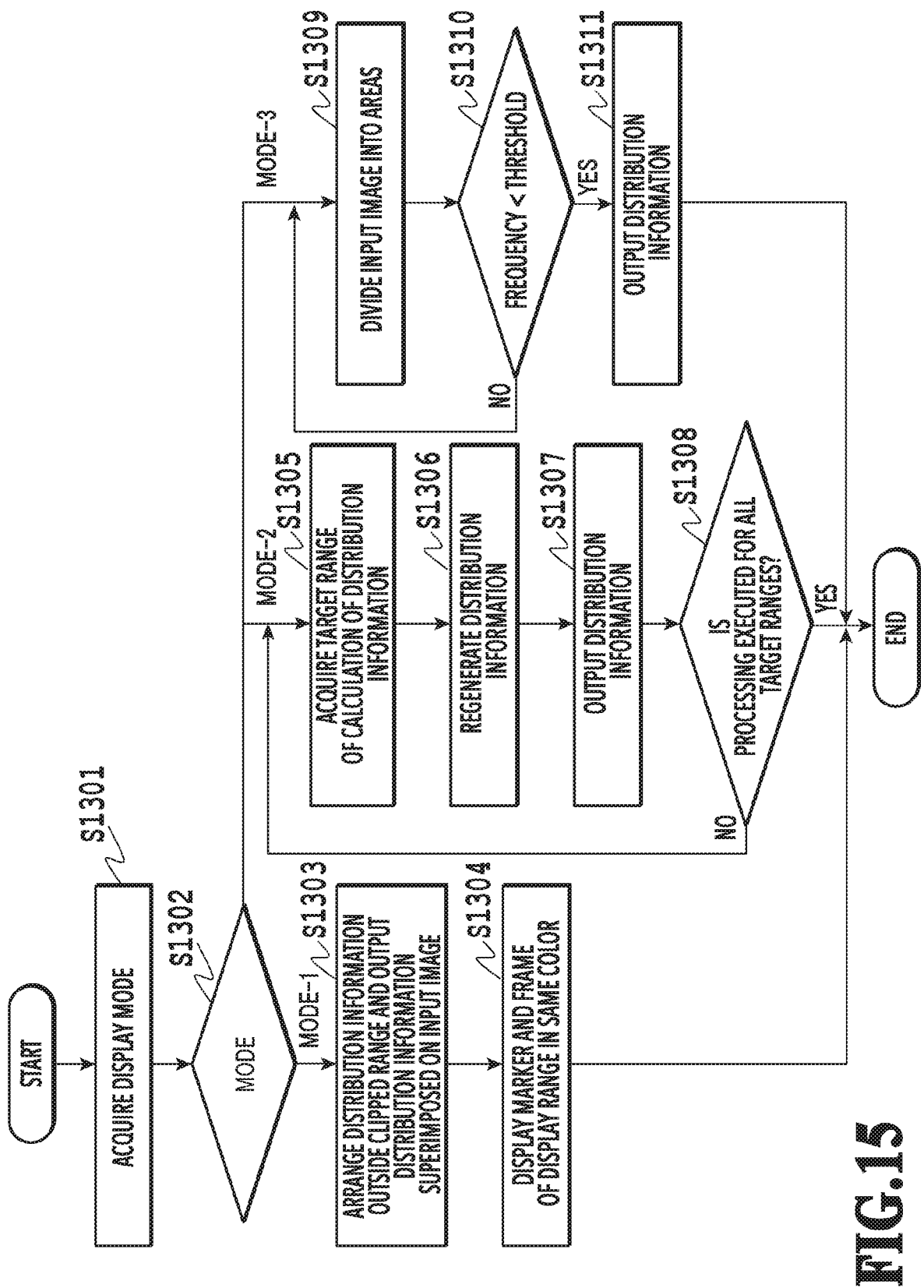
FIG. 15 is a flowchart showing a procedure of processing executed by the output image generation unit.

FIG. 15 is a flowchart showing a procedure of processing executed in the output image generation unit 206. The processing in S510 of FIG. 5 will be described as the processing from S1301 to S1311.

In S1301, the output image generation unit 206 acquires a display mode for determining where in the input image a distribution information image is displayed. The processing in S1301 is executed based on a user instruction via the input device 107. In the present embodiment, the display mode is acquired by selecting one of a plurality of display modes prestored in the HDD 105 based on a user instruction (setting).

Figure 16A:
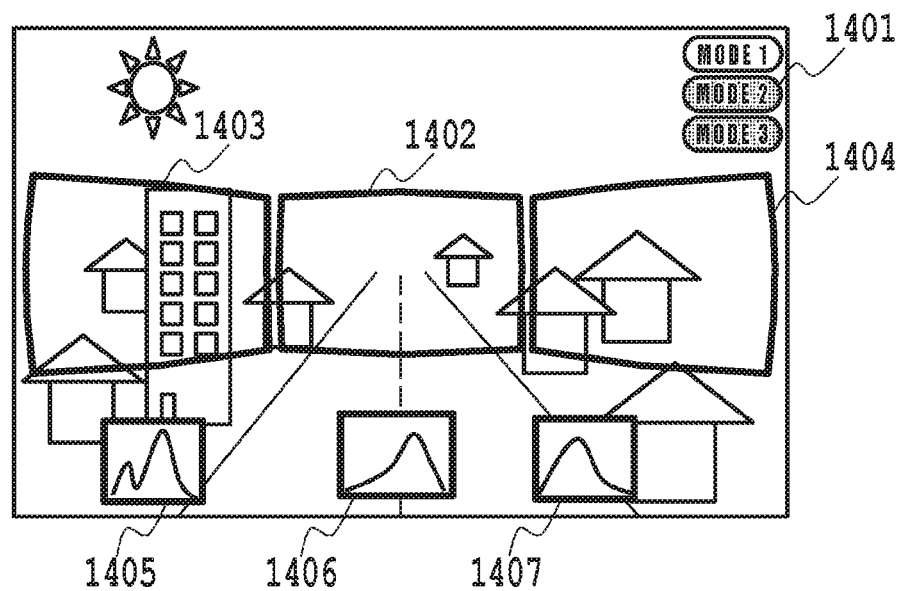
FIG. 16A is a diagram showing an image obtained by superimposing distribution information images on an input image.

In the present embodiment, three display modes are stored as display modes. First, in a case where the display mode is 1, as shown in FIG. 16A, the distribution information 1405 to 1407 is arranged outside the clipped ranges 1402 to 1404, thereby performing display such that the composition and objects within the clipped ranges can be easily identified.

Figure 16B:
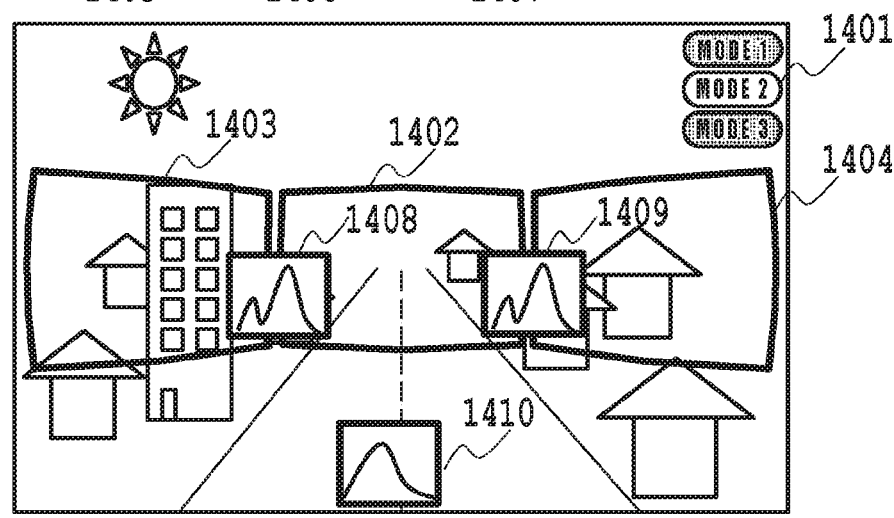
FIG. 16B is a diagram showing an image obtained by superimposing distribution information images on an input image.

Next, in a case where the display mode is 2, as shown in FIG. 16B, distribution information on the clipped ranges 1402 and 1403 is collectively arranged as shown by the reference numeral 1408 and distribution information on the clipped ranges 1402 and 1404 is collectively arranged as shown by the reference numeral 1409. Similarly, distribution information on the clipped ranges 1402 to 1404 is collectively arranged as shown by the reference numeral 1410. In this manner, signal values of a plurality of clipped ranges are collectively arranged.

Figure 16C:
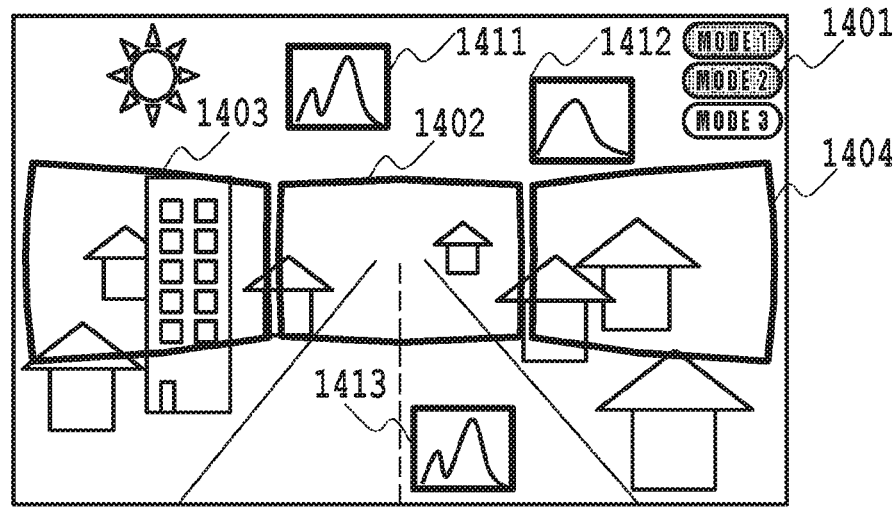
FIG. 16C is a diagram showing an image obtained by superimposing distribution information images on an input image.

In a case where the display mode is 3, as shown in FIG. 16C, distribution information 1411 to 1413 is superimposed and arranged on the input image so as not to overlap the main objects in the input image, thereby performing display such that the objects can be easily identified.

In S1302, the output image generation unit 206 determines which display mode the display mode acquired in S1301 is. The output image generation unit 206 moves the processing to S1303 in a case where the display mode is 1, moves the processing to S1305 in a case where the display mode is 2, and moves the processing to S1309 in a case where the display mode is 3.

In S1303, the output image generation unit 206 arranges distribution information outside the clipped ranges as shown in FIG. 16A and outputs the distribution information superimposed on the input image to the output device 109 via the output I/F 108. In S1304, the output image generation unit 206 displays the frame indicating the edge area of each distribution information in the same color as the marker indicating the edge area of the corresponding clipped range such that correspondences between the clipped ranges and distribution information on the clipped ranges can be understood.

In S1305, the output image generation unit 206 acquires a target range of calculation of distribution information as shown in FIG. 16B. The distribution information is not necessarily generated separately for each clipped range and may be selected from among prestored target ranges based on a user instruction. Although adjacent clipped ranges and all the clipped ranges are collectively set as target ranges in FIG. 16B, it is also possible to set left and right screens collectively as a target range, for example.

In S1306, the output image generation unit 206 regenerates distribution information based on pixel values of coordinates corresponding to the target range acquired in S1305. In S1307, the output image generation unit 206 superimposes the distribution information regenerated in S1306 on the input image and outputs them to the output device 109 via the output I/F 108. In S1308, the output image generation unit 206 determines whether the processing has been executed for all the target ranges acquired in S1305. The output image generation unit 206 finishes the processing shown in FIG. 15 in a case where the processing has been executed and returns the processing to S1305 in a case where the processing has not been executed.

In S1309, the output image generation unit 206 divides the input image into areas having the sizes of areas in which distribution information is displayed. It is assumed that the sizes of the areas of the distribution information are the same as those in the first embodiment described above. In S1310, the output image generation unit 206 first performs the Fourier transform for each pixel value in the areas divided in S1309 using the following formula (6) to calculate a spatial frequency characteristic F (u, v). In the following formula, $G^*(x, y)$ represents a pixel value in the area divided in S1309, which is a target of the Fourier transform, and M and N represent the numbers of vertical and horizontal pixels, respectively, in the divided area.

$$F(u, v) = \frac{1}{M \times N} \sum_{x=0}^{M-1} \sum_{y=0}^{N-1} G*(x, y) \times e^{-j2\pi\left(\frac{xu}{M} + \frac{yu}{N}\right)} \quad \text{Formula (6)}$$

Next, the spatial frequency characteristic calculated by the above formula (6) is compared with a predetermined threshold. In a case where the frequency is lower than the threshold, it is determined that there is no texture and the processing is moved to S1311. In a case where the frequency is equal to or higher than the threshold, it is determined that there is texture and the processing is returned to S1309 to search for an area with no texture again. In S1311, the output image generation unit 206 arranges the distribution information on an area in which it is determined that there is no texture as a result of the processing of S1310 and outputs the distribution information superimposed on the input image to the output device 109 via the output I/F 108.

As described above, according to the image processing apparatus of the present embodiment, a user can set exposure and white balance at the time of image capturing more appropriately by selecting a method of superimposing distribution information on an input image from among a plurality of methods.

Modification

Figure 17A:
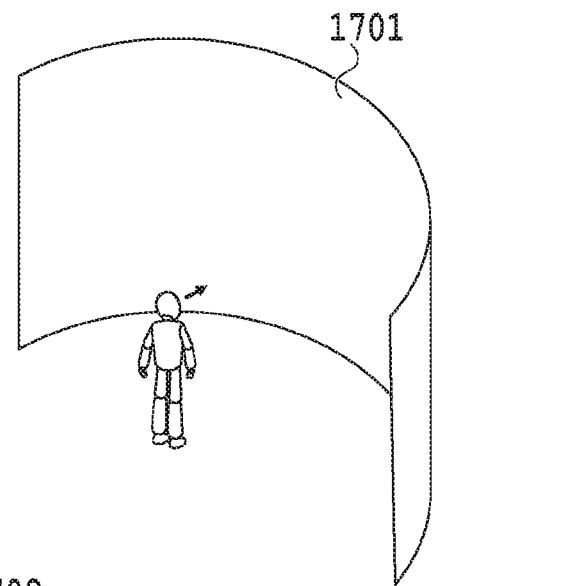
FIG. 17A is a diagram showing an example of a curved screen.
Figure 17B:
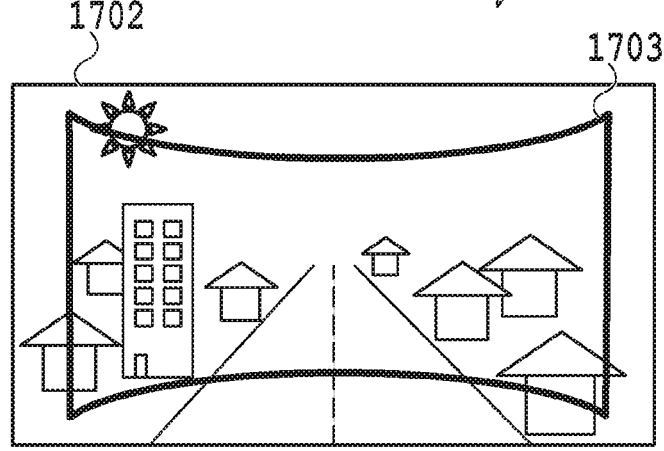
FIG. 17B is a diagram showing an example of a curved screen.
Figure 17C:
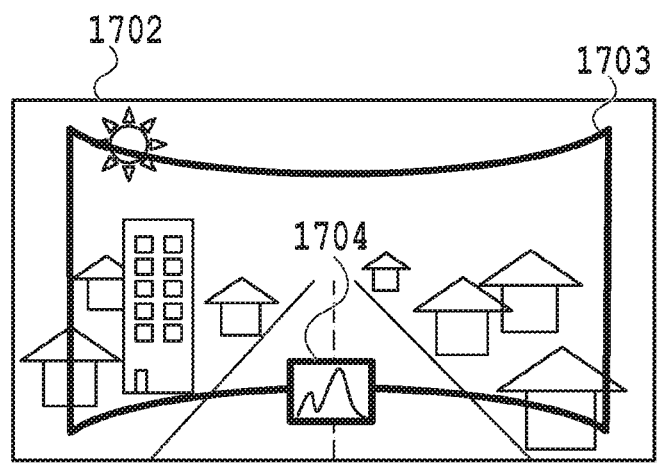
FIG. 17C is a diagram showing an example of a curved screen.

In the embodiments described above, the first display system is the three screens arranged to surround a viewer. However, the system may be a curved screen arranged to surround a viewer. FIG. 17A shows an example of a curved screen 1701. FIG. 17B shows a display range 1703 clipped from a captured image 1702 so as to display a part of the captured image 1702 on the first display system, which is the curved screen. FIG. 17C shows an image obtained by superimposing a distribution information image 1704 on the input image. It is understood that the shape of the clipped range corresponds to the curved screen.

Figure 18C:
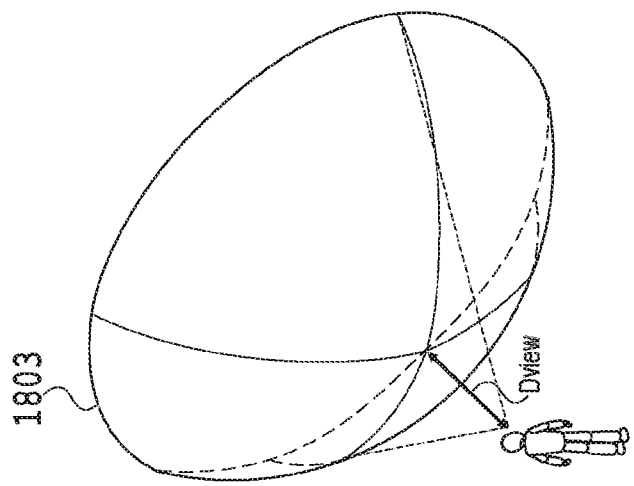
FIG. 18C is a diagram showing an example of a screen having a special shape.
Figure 18B:
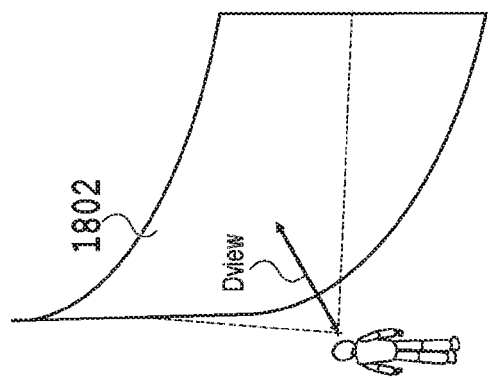
FIG. 18B is a diagram showing an example of a screen having a special shape.
Figure 18A:
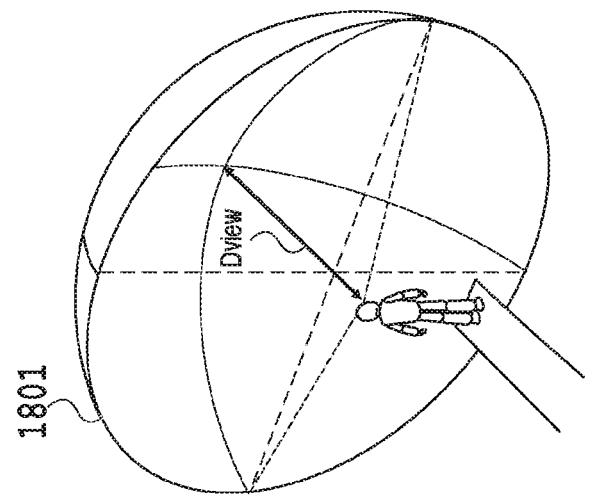
FIG. 18A is a diagram showing an example of a screen having a special shape.

The first display system is not limited to the examples described above and may be a spherical screen 1801 shown in FIG. 18A or a curved screen 1802 having a shape partially cut off from a side surface of a cylinder shown in FIG. 18B. Alternatively, the display system may be a spherical screen 1803 having a shape partially cut off from a sphere shown in FIG. 18C.

Figure 3C:
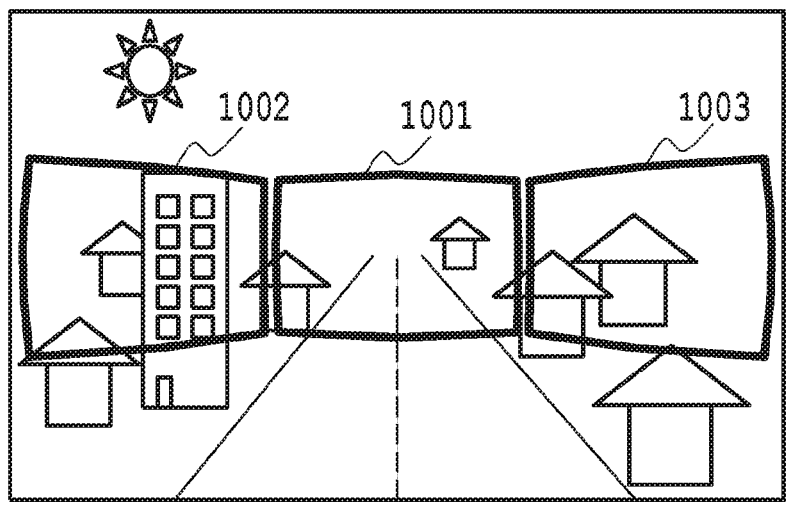
FIG. 3C is a diagram showing an example of the display ranges.

In the embodiments described above, an image obtained by superimposing distribution information images on an input image is displayed. However, an image to be displayed may be switched according to a user instruction. For example, the display may be switched between the image alone shown in shown in FIG. 3A, the image and frames shown in FIG. 3C, and the image, frames, and distribution information shown in FIG. 14C.

The output unit 207 in the embodiments described above outputs the generated image data with distribution information to the output device 109. However, the output unit 207 may function as a display control unit which controls the display of an image with distribution information.

Figure 19A:
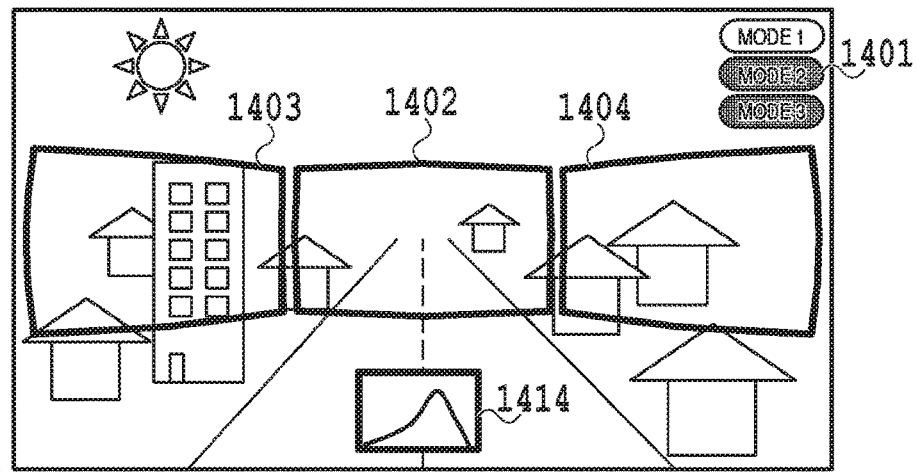
FIG. 19A is a diagram showing an image obtained by superimposing distribution information images on an input image.
Figure 19B:
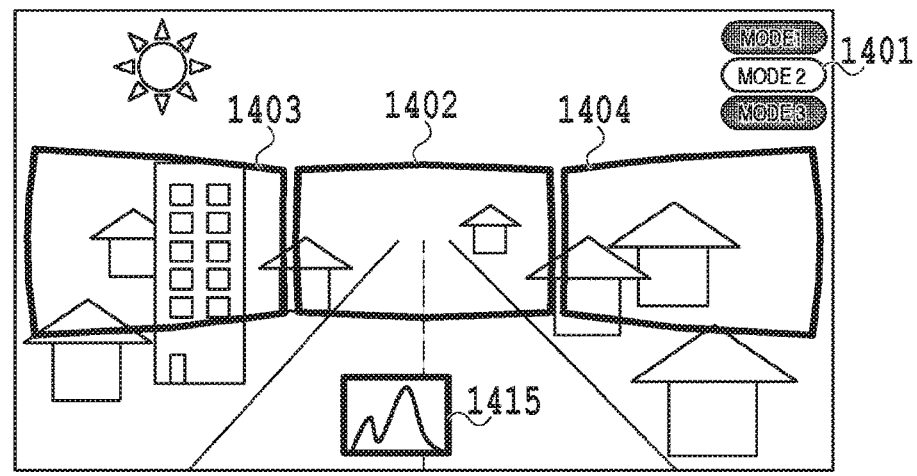
FIG. 19B is a diagram showing an image obtained by superimposing distribution information images on an input image.
Figure 19C:
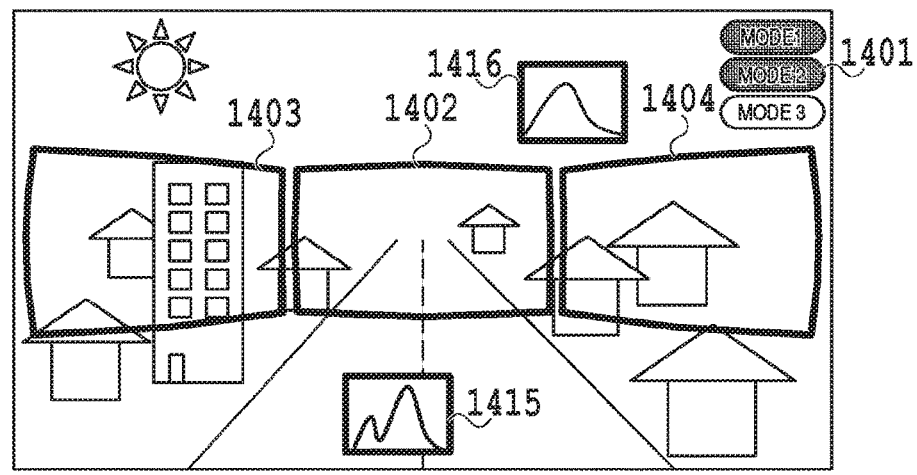
FIG. 19C is a diagram showing an image obtained by superimposing distribution information images on an input image.

In the embodiments described above, the three display modes are shown as an example of a display mode. However, another display mode may be stored. For example, the distribution information 1414 on only the front clipped range 1402 may be solely arranged as shown in FIG. 19A without displaying a histogram of all the three screens. Alternatively, as shown in FIG. 19B, distribution information on the clipped ranges 1402 to 1404 of the three screens may be added up and arranged as distribution information 1415. Alternatively, as shown in FIG. 19C, distribution information 1415 obtained by adding up the distribution information on the clipped ranges 1402 to 1404 of the three screens and distribution information 1416 on an area other than the clipped ranges 1402 to 1404 may be arranged.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the embodiments, the image capturing apparatus can be provided with distribution information on an image capturing signal suitable for a display apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2019-133568, filed Jul. 19, 2019 and No. 2020-061442, filed Mar. 30, 2020 which are hereby incorporated by reference wherein in its entirety.

What is claimed is:
1. An image processing apparatus comprising:
one or more memories storing instructions; and
one or more processors configured by the instructions stored by the one or more memories at least to:
acquire image data;
acquire configuration information about a multiple-display system comprising a first display apparatus and a second display apparatus, the multiple-display system configured to display, via the first display apparatus, a first part of an image indicated by the image data, and to display, via the second display apparatus, a second part of the image indicated by the image data, the second part of the image being a different part of the image than the first part of the image;
determine a first clipped range corresponding to the first part of the image based on the configuration information;
determine a second clipped range corresponding to the second part of the image based on the configuration information;
cause the multiple-display system to display, via the first display apparatus, the first part of the image with first distribution information of pixel values corresponding to the first clipped range, which corresponds to the first part of the image; and
cause the multiple-display system to display, via the second display apparatus, the second part of the image with second distribution information of pixel values corresponding to the second clipped range, which corresponds to the second part of the image.

2. The image processing apparatus according to claim 1, wherein the image data is image data obtained by image capturing by an image capturing apparatus, and the one or more processors is or are configured by the instructions at least to cause a display system of the image capturing apparatus to display at least part of the image with distribution information.

3. The image processing apparatus according to claim 1, wherein at least the first clipped range corresponding to the first part of the image has a shape different from a rectangle.

4. The image processing apparatus according to claim 1, wherein at least the first clipped range corresponding to the first part of the image has a shape according to a type of optical system of an image capturing apparatus configured to perform image capturing to obtain the image data.

5. The image processing apparatus according to claim 1, wherein at least the first clipped range corresponding to the first part of the image has a shape according to a configuration of the first display apparatus.

6. The image processing apparatus according to claim 1,
wherein the image indicated by the image data is a first image indicated by first image data, and the one or more processors is or are configured by the instructions at least to generate image data indicating a generated image obtained by superimposing at least the first distribution information on the first image, and
wherein the one or more processors is or are configured by the instructions at least to cause the multiple-display system to display the generated image.

7. The image processing apparatus according to claim 1, wherein at least the first distribution information includes a histogram of pixel values, a waveform signal of pixel values, or a chromaticity distribution of pixel values.

8. The image processing apparatus according to claim 1, wherein at least the first distribution information is generated based on at least some pixel values corresponding to the first clipped range, which corresponds to the first part of the image.

9. The image processing apparatus according to claim 1, wherein the configuration information includes at least information about a size of a display of the first display apparatus and arrangement information about the display of the first display apparatus.

10. The image processing apparatus according to claim 1, wherein the one or more processors is or are configured by the instructions at least to generate coordinates of a point corresponding to a position of an edge of an image display area in a display of the first display apparatus as point group data and to determine the first clipped range corresponding to the first part of the image based on the point group data.

11. The image processing apparatus according to claim 1, wherein the one or more processors is or are configured by the instructions at least to:
acquire an image capturing condition in a case where an image capturing apparatus performs image capturing to obtain the image data;
acquire a position of a viewer who views an image displayed on or by the multiple-display system; and
determine at least the first clipped range corresponding to the first part of the image based on the configuration information, the image capturing condition, and the position of the viewer.

12. The image processing apparatus according to claim 11, wherein the image capturing condition includes at least a size of a sensor of the image capturing apparatus, a focal length of a lens of the image capturing apparatus, or a projection method of the lens of the image capturing apparatus.

13. The image processing apparatus according to claim 1, wherein a size of a range in which at least the first distribution information is displayed is set based on a determined range.

14. The image processing apparatus according to claim 1, wherein arrangement of at least the first distribution information, in a case where the first distribution information is superimposed on the image and displayed, is determined based on a user instruction.

15. The image processing apparatus according to claim 1, wherein the one or more processors is or are configured by the instructions at least to cause the multiple-display system to display at least some distribution information outside a range corresponding to a part of the image.

16. The image processing apparatus according to claim 1,
wherein the one or more processors is or are configured by the instructions at least to set a plurality of ranges in the image, and
wherein distribution information of pixel values corresponding to at least two ranges out of the plurality of ranges in the image is collectively generated.

17. The image processing apparatus according to claim 1, wherein, in a case where at least the first distribution information is superimposed on the image and displayed, the one or more processors is or are configured by the instructions at least to cause the display system to display at least the first distribution information such that at least the first distribution information does not overlap a main object included in the image.

18. An image processing method comprising:
an image data acquisition step of acquiring image data;
a configuration information acquisition step of acquiring configuration information about a multiple-display system comprising a first display apparatus and a second display apparatus, the first display apparatus displaying a first part of an image indicated by the image data, and the second display apparatus displaying a second part of the image indicated by the image data, the second part of the image being a different part of the image than the first part of the image;
a first range determination step of determining a first clipped range corresponding to the first part of the image based on the configuration information;
a second range determination step of determining a second clipped range corresponding to the second part of the image based on the configuration information;

a first display control step of causing the multiple-display system to display, via the first display apparatus, the first part of the image with first distribution information of pixel values corresponding to the first clipped range, which corresponds to the first part of the image; and a second display control step of causing the multiple-display system to display, via the second display apparatus, the second part of the image with second distribution information of pixel values corresponding to the second clipped range, which corresponds to the second part of the image.

19. A non-transitory computer readable storage medium storing a program for causing a computer to perform a method of processing an image, the method comprising the steps of:

acquiring image data;

acquiring configuration information about a multiple-display system comprising a first display apparatus and a second display apparatus, the first display apparatus displaying a first part of an image indicated by the image data, and the second display apparatus displaying a second part of the image indicated by the image data, the second part of the image being a different part of the image than the first part of the image;

determining a first clipped range corresponding to the first part of the image based on the configuration information;

determining a second clipped range corresponding to the second part of the image based on the configuration information;

causing the multiple-display system to display, via the first display apparatus, the first part of the image with first distribution information of pixel values corresponding to the first clipped range, which corresponds to the first part of the image; and causing the multiple-display system to display, via the second display apparatus, the second part of the image with second distribution information of pixel values corresponding to the second clipped range, which corresponds to the second part of the image.

20. An image processing apparatus comprising:

one or more memories storing instructions; and one or more processors configured by the instructions stored by the one or more memories at least to:

acquire image data;

acquire configuration information about a display apparatus which displays at least a part of an image indicated by the image data, the part of the image being a clipped area of the image;

determine a range corresponding to the part of the image based on the configuration information, the range corresponding to the part of the image having a shape according to a type of optical system of an image capturing apparatus configured to perform image capturing to obtain the image data; and cause a display system to display at least the part of the image with distribution information of pixel values corresponding to the range, which corresponds to the part of the image.

21. The image processing apparatus according to claim 20, wherein the one or more processors is or are configured by the instructions at least to:

acquire an image capturing condition in a case where the image capturing apparatus performs image capturing to obtain the image data; and acquire a position of a viewer who views an image displayed on or by the display apparatus; and, determine the range corresponding to the part of the image based on the configuration information, the image capturing condition, and the position of the viewer.

22. The image processing apparatus according to claim 21, wherein the image capturing condition includes at least a size of a sensor of the image capturing apparatus, a focal length of a lens of the image capturing apparatus, or a projection method of the lens of the image capturing apparatus.

23. An image processing apparatus comprising:

one or more memories storing instructions; and one or more processors configured by the instructions stored by the one or more memories at least to:

acquire image data;

acquire configuration information about a display system which displays a consecutive area within a part of an image indicated by the image data, the display system comprising at least two display units, the configuration information including at least information about a size of each display unit of the at least two display units, a resolution of each display unit of the at least two display units and an arrangement of each display unit of the at least two display units;

correlate the consecutive area with a display area of each display unit of the at least two display units based on the configuration information; and cause the display system to display the image indicated by the image data with distribution information of pixel values in the display area of each display unit of the at least two display units.

\* \* \* \* \*